United States Patent
Anamanamuri et al.

(10) Patent No.: US 12,141,140 B2
(45) Date of Patent: *Nov. 12, 2024

(54) SELECTING A HOST BASED ON QUALITY OF STORED DATA

(71) Applicant: eBay Inc., San Jose, CA (US)

(72) Inventors: Suresh Anamanamuri, San Jose, CA (US); Mahesh Somani, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,647

(22) Filed: Nov. 17, 2022

(65) Prior Publication Data

US 2023/0079026 A1    Mar. 16, 2023

Related U.S. Application Data

(63) Continuation of application No. 16/783,078, filed on Feb. 5, 2020, now Pat. No. 11,544,258.

(51) Int. Cl.
  *G06F 16/22*    (2019.01)
  *G06F 11/30*    (2006.01)
  *G06F 11/34*    (2006.01)
  *G06F 16/2453*    (2019.01)

(52) U.S. Cl.
  CPC ...... *G06F 16/2453* (2019.01); *G06F 11/3006* (2013.01); *G06F 11/3495* (2013.01)

(58) Field of Classification Search
  CPC ............. G06F 16/2453; G06F 11/3006; G06F 11/3495
  See application file for complete search history.

(56) References Cited

U.S. PATENT DOCUMENTS

| | | | |
|---|---|---|---|
| 6,393,387 B1 * | 5/2002 | Adriaans | G06F 11/3447 |
| | | | 706/14 |
| 7,370,064 B2 | 5/2008 | Yousefi'zadeh | |
| 7,509,343 B1 | 3/2009 | Washburn et al. | |
| 8,965,921 B2 | 2/2015 | Gajic | |

(Continued)

OTHER PUBLICATIONS

U.S. Appl. No. 16/783,078, "Final Office Action", U.S. Appl. No. 16/783,078, Jun. 16, 2022, 18 pages.

(Continued)

*Primary Examiner* — Tarek Chbouki
(74) *Attorney, Agent, or Firm* — FIG. 1 Patents

(57) ABSTRACT

A database node selects one of a number of database mirror hosts to perform a database read query. In theory, mirror hosts store redundant database entries. In practice, some mirror hosts fail to receive or retain some entries, e.g. if a mirror host was down for maintenance, a mirror host was overburdened, etc. The health of a mirror host, quantified as a health score, represents a likelihood that an insert statement was received and retained. Health scores are generated based on health metrics—data periodically retrieved from mirror hosts used to infer how well the database was operating, e.g. a count of entries that were inserted, a count of errors encountered while the entries were inserted, etc. If the database read query specifies entries inserted during a specific time period, the mirror host may be selected based on the health scores representing that time period.

20 Claims, 22 Drawing Sheets

(56) References Cited

U.S. PATENT DOCUMENTS

| | | | |
|---|---|---|---|
| 9,594,653 B1* | 3/2017 | Misra | G06F 11/2028 |
| 10,776,241 B1 | 9/2020 | Christensen et al. | |
| 10,810,054 B1 | 10/2020 | Martinez Lerin | |
| 11,544,258 B2 | 1/2023 | Anamanamuri et al. | |
| 2009/0187917 A1* | 7/2009 | Jang | G06F 16/2365 |
| | | | 707/E17.008 |
| 2010/0106990 A1 | 4/2010 | Kalman | |
| 2011/0295807 A1 | 12/2011 | Bernbo et al. | |
| 2013/0091105 A1 | 4/2013 | Bhave et al. | |
| 2013/0346587 A1 | 12/2013 | Barkett et al. | |
| 2014/0279936 A1 | 9/2014 | Bernbo et al. | |
| 2014/0280899 A1 | 9/2014 | Brewster, Jr. et al. | |
| 2014/0325363 A1 | 10/2014 | Fletcher et al. | |
| 2016/0127256 A1 | 5/2016 | Sharma et al. | |
| 2016/0225562 A1* | 8/2016 | Franks | H02H 3/006 |
| 2016/0306822 A1* | 10/2016 | Waghulde | G06F 16/1847 |
| 2017/0075965 A1 | 3/2017 | Liu et al. | |
| 2017/0168909 A1 | 6/2017 | Kobashi | |
| 2017/0344618 A1 | 11/2017 | Horowitz et al. | |
| 2018/0246945 A1 | 8/2018 | Lee et al. | |
| 2019/0266070 A1* | 8/2019 | Bhandarkar | G06F 11/3072 |
| 2020/0004860 A1 | 1/2020 | Maheshwari et al. | |
| 2020/0007620 A1* | 1/2020 | Das | H04L 67/62 |
| 2020/0012734 A1* | 1/2020 | Lee | G06F 16/2379 |
| 2020/0034365 A1* | 1/2020 | Martin | G06F 16/24554 |
| 2020/0076763 A1 | 3/2020 | Elsloo | |
| 2020/0134077 A1 | 4/2020 | Tong | |
| 2020/0183703 A1 | 6/2020 | Kumar et al. | |
| 2020/0341955 A1* | 10/2020 | Sukumaran | G06F 16/1724 |
| 2021/0034477 A1* | 2/2021 | Pederson | G06F 11/1471 |
| 2021/0133183 A1* | 5/2021 | Biswas | H04L 67/101 |
| 2021/0173767 A1* | 6/2021 | Zhang | G06F 16/211 |
| 2021/0227351 A1 | 7/2021 | Mei et al. | |
| 2021/0240703 A1 | 8/2021 | Anamanamuri et al. | |

OTHER PUBLICATIONS

U.S. Appl. No. 16/783,078, "Non Final Office Action Received for U.S. Appl. No. 16/783,078, mailed on Dec. 21, 2021", Dec. 21, 2021, 16 Pages.

U.S. Appl. No. 16/783,078, "Notice of Allowance", U.S. Appl. No. 16/783,078, Sep. 13, 2022, 8 pages.

Vukolic, "The Origin of Quorum Systems", Retrieved from the Internet: <http://vukolic.com/QuorumsOrigin.pdf>, Jun. 2010, 23 Pages.

* cited by examiner

| Time Periods 404 | Number of Entries Added 308 | Number of Failed Inserts 310 | Host Downtime 312 | Host Over-burdened 314 | Request Query Latency 316 |
|---|---|---|---|---|---|
| 8:00-8:01 | 600,000 | 9 | 0 | 0ms | 11ms |
| 7:59-8:00 | 500,000 | 7 | 0 | 0ms | 12ms |
| 7:58-7:59 | 640,000 | 43 | 0 | 0ms | 13ms |
| 7:57-7:58 | 500,000 | 75 | 0 | 0ms | 12ms |
| 7:56-7:57 | 450,000 | 2,434 | 0 | 250ms | 52ms |

Table 402B

Health Metrics Store 306B

Over-burdened Resource 410

| TIME PERIODS 404 | NUMBER OF ENTRIES ADDED 308 | NUMBER OF FAILED INSERTS 310 | HOST DOWNTIME 312 | HOST OVER-BURDENED 314 | REQUEST QUERY LATENCY 316 |
|---|---|---|---|---|---|
| 8:00-8:01 | 0 | 0 | 1000ms | 0ms | N/A |
| 7:59-8:00 | 0 | 0 | 1000ms | 0ms | N/A |
| 7:58-7:59 | 320,000 | 0 | 400ms | 0ms | 23ms |
| 7:57-7:58 | 500,000 | 0 | 0ms | 0ms | 12ms |
| 7:56-7:57 | 650,000 | 0 | 0ms | 0ms | 10ms |

HEALTH METRICS STORE 306C

TABLE 402C

Offline 412

SELECTING A HOST BASED ON QUALITY OF STORED DATA

RELATED APPLICATION

This application is a continuation of and claims the benefit of priority to U.S. patent application Ser. No. 16/783,078, filed on Feb. 5, 2020, and titled "Selecting A Host Based On Quality of Stored Data," the entire disclosure of which is hereby incorporated by reference.

BACKGROUND

A distributed database can store vast amounts of information by partitioning data and storing it across multiple database nodes. A database node may improve reliability by storing redundant copies of data in multiple database hosts (or in 'mirror hosts' or server 'hosts'). For example, a database node may forward insert statements to mirror hosts, causing each mirror host to store a set of mirrored database entries.

However, existing systems have a number of drawbacks. For example, it is a technological challenge to balance the efficiency and accuracy of retrieving data from mirror hosts. Since data may not be duplicated perfectly across mirror hosts, retrieving data from a single mirror host may yield an inaccurate or incomplete result. Another technological challenge is that retrieving data from all mirror hosts and comparing the results may consume significant computing resources and increase latency. In some cases, latency may be high enough to trigger a timeout, causing the query to fail unexpectedly.

It is with respect to these and other technical considerations that the disclosure made herein is presented.

SUMMARY

A database node selects one of a number of mirror hosts to perform a database query. Forwarding the query to a single mirror host allows the query to be performed with less latency and using fewer computing resources than if the query was sent to some or all of the mirror hosts. However, not all mirror hosts have received, processed, and retained the result of every insert statement. Some of the mirror hosts may be missing a significant percentage of database entries, and so sending a query to a single mirror host at random carries an unacceptable risk of returning inaccurate or incomplete results.

To overcome this technological challenge, the database node selects a mirror host based on the quality of stored data in each mirror host. Data is high quality if it is complete and accurate. Conversely, data is low quality to the extent it is incomplete or inaccurate. Data quality is measured indirectly. A direct measurement, e.g. submitting a full query to every mirror host and analyzing the results, would negate any performance and efficiency benefit of forwarding the received database query to a single mirror host.

One indirect measurement of data quality is the health of the mirror host at the time the data was inserted. The health of a mirror host reflects the ability of the mirror host to receive and process insert statements. A healthy mirror host is online, responsive to requests, and capable of processing the volume of insert statements provided to it. As such, the healthier the mirror host was at the time an insert statement was received, the more likely the mirror host is to have successfully performed the insert statement. The health of a mirror host may be quantified as a health score. Using a measurement of health to select a mirror host may improve query performance and accuracy compared to techniques that measure a quality of result sets returned from multiple mirror hosts before returning query results. Because it may be performed efficiently, the disclosed embodiments may also lead to a technical advantage of more accurate data results being returned from a database mirror host.

In some embodiments, a health score is generated based on health metrics received from the mirror hosts. For example, the database node may periodically (e.g. every minute) request health metrics from each mirror host. Health metrics summarize database activity on the mirror host since the previous request, e.g. how many entries were added, how many errors were encountered while inserting entries, how long was the mirror host unavailable, how long was some hardware component of the mirror host overburdened, etc. By being fast to compute, a technical advantage may also be that health metrics may improve efficiency of an overall system because the host with the best results may be identified quickly rather than having to inspect results from various mirror hosts for a given time period.

In some embodiments, in response to the database query, a health score is generated for a query-specified time period. The health score for the query-specified time period may be based on health metrics that coincide with the query-specified time period. For example, if the query-specified time period is between 5 pm and 6 pm, i.e. the database query is for entries that were inserted between 5 pm and 6 pm, the database node may compute health scores for each mirror host for that time period. The database node may then forward the received query to the mirror host with the highest health score between 5 pm and 6 pm. This maximizes the likelihood that the database query will be performed by the mirror host that successfully inserted the most database entries between 5 pm and 6 pm.

A health score may be generated from health metrics by normalizing, weighting, and aggregating the health metrics that coincide with the query-specified time period. For example, if health metrics are retrieved from each mirror host at an interval of once a minute, then a health score for a query-specified time period of 5 pm to 6 pm may be generated based on health metrics retrieved at 5:01 pm, 5:02 pm, . . . , 6:00 pm.

In some configurations, a mirror host is only selected if the health score for the query-specified time period exceeds a threshold value. The threshold value may be configurable by an administrator of the distributed database node. In another embodiment, the quality threshold value may be provided as a parameter of the database query. For example, as one example in SQL, a query may be:

Select * from Table1 Where Field1=Value1 and Health_Quality_Threshold=High. In the example given, by providing a quality threshold as a parameter to the query, the database processing engine may retrieve data from mirror hosts with a "High" quality level. The threshold may be on a numerical score, specified by descriptors, or any other method. As yet another example, a parameter may be specified along with the time period:

Select * from Table1 Where Field1=Value1 and Health_Quality_Threshold=3 and DataDate>='1/1/2020 3:00' and DataDate<='1/1/2020 4:00' In the latter example, the database engine may test the server for the quality level (e.g., a numerical 3) within the dates/times specified.

If more than one mirror host has a health score that exceeds the threshold value, a mirror host with the highest health score may be selected to perform the database query. In other embodiments, additional criteria may be used to select one of the threshold-exceeding mirror hosts. For example, the database node may select a mirror host that has spare capacity, while avoiding mirror hosts that exhibit a high load. Spare capacity may be inferred from an average latency of read queries recently performed by the mirror host.

In some configurations, no single mirror host has a health score that exceeds the threshold value for the query-defined time period. In this case, the database query may be partitioned into two or more sub-queries and forwarded to two or more mirror hosts. Each sub-query may retrieve entries that were inserted when the corresponding mirror host had a health score that exceeded the threshold value. The results of the two or more sub-queries may be aggregated and returned to the client computing device.

By forwarding the database query to the healthiest mirror host the database query requires significantly fewer computing resources than if the database query were forwarded to some or all of the mirror hosts. At the same time, forwarding the database query to the healthiest mirror host reduces the likelihood that the selected mirror host will return incomplete or inaccurate data. Other technical benefits not specifically mentioned herein can also be realized through implementations of the disclosed technologies.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

In various embodiments, the following Detailed Description presents technologies for selecting a database mirror host based on the quality of data stored in each mirror host. By forwarding a database query to a single database mirror host, latency and computing resources used to perform the query are reduced compared to solutions that forward the query to some or all of the mirror hosts. However, some mirror hosts may contain less data than their peers. As such, there is a risk that forwarding the database query to a single database mirror host, selected at random, will return inaccurate or incomplete results.

It is to be appreciated that while the technologies disclosed herein are primarily described in the context of a distributed database, the disclosed technologies can also be utilized with any database, e.g. Hadoop, Sybase, The Oracle Database™. Furthermore, the technologies disclosed herein may be used with any server-based application that receives data over time, mirrors data across multiple mirror hosts, and allows for the received data to be queried. The term "mirror host" is used herein to describe one of a number of data stores that are sent duplicate data insertion commands (e.g. SQL insert statements, bulk data loads, etc.). It is to be appreciated that computing devices may have this property without being called mirror hosts, or even hosts, and still be applicable to the disclosed embodiments.

It is also to be appreciated that 'database', as used throughout this document, may include one or more tables, views, indexes, stored procedures, and/or other database objects designed and programmed by a software engineer.

Referring to the appended drawings, in which like numerals represent like elements throughout the several FIGURES, aspects of various technologies for selecting a database mirror host based on the quality of data stored in each mirror host will be described. In the following detailed description, references are made to the accompanying drawings that form a part hereof, and which are shown by way of illustration specific configurations or examples.

Figure 1:
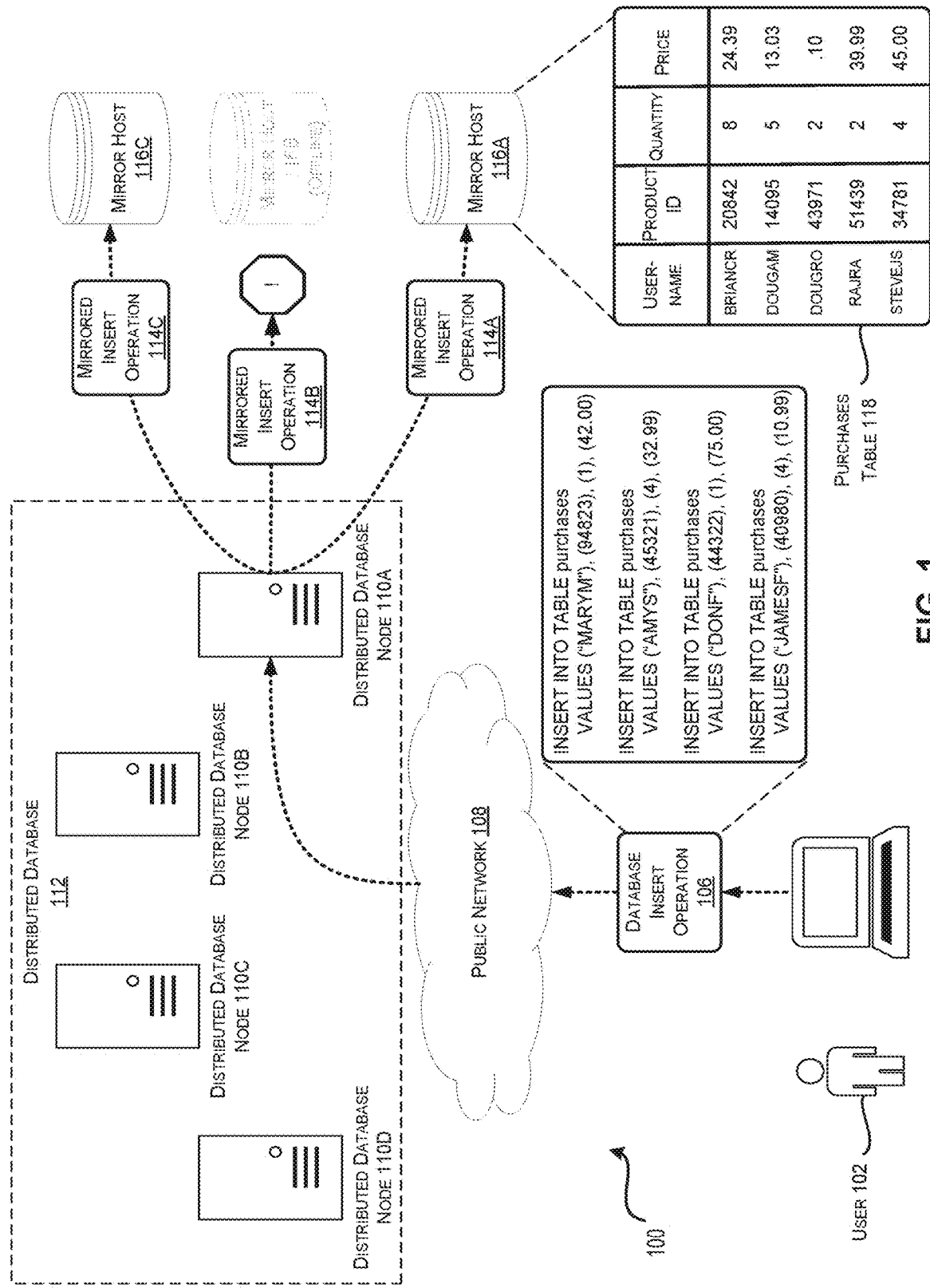
FIG. 1 is a system diagram illustrating one embodiment of mirroring an insert operation across a number of mirror hosts.

FIG. 1 is a system diagram 100 illustrating one embodiment of mirroring insert operation 106 across a number of mirror hosts 116. User 102 may cause client computing device 104 to submit database insert operation 106 to distributed database 112 via public network 108. The distributed database 112 may constitute multiple distributed database nodes 110. In some embodiments, distributed database 112 is partitioned, such that database operations are forwarded to a corresponding one of the distributed database nodes 110 based on a partition criteria. However, as discussed briefly above, the techniques described herein may be applied to a non-distributed database, e.g. a traditional relational database. The techniques described herein may be used in mirrors of web sites, disk clones used in backup software, replicated storage systems, or any other context where data is repeated across devices.

In some embodiments, distributed database node 110A forwards database insert operation 106 to each mirror host 116. To do this, distributed database node 110A may generate mirrored insert operations 114 and forward them to mirror hosts 116. In this way, all mirror hosts 116 have been sent the same set of mirrored insert operations 114. As such, if all mirrored insert operations were successfully delivered to the corresponding mirror host, if no mirror host experienced downtime or was overburdened, and if each mirror host contained enough computing power and storage capacity to process the mirrored insert operations 114, then each mirror host 116 would contain redundant copies of data.

However, in the real world, there are many reasons that this is not the case. For example, mirror hosts 116 may periodically be taken off-line for scheduled maintenance. Network disruptions, hardware failures, operating system crashes, and other events may also cause a mirror host to experience a period during which mirrored insert operations 114 are not processed. As depicted in FIG. 1, mirror host 116B is off-line, and so mirrored insert operation 114B is not processed. As a result, mirror host 116B will not be a perfect replica of mirror hosts 116A and 116C.

As depicted, distributed database node 110 receives database insert operation 106, mirrors it, and sends mirrored insert operations 114 to mirror hosts 116. However, it is also contemplated that distributed database node 110A will also perform database insert operation 106, essentially creating another mirror host.

Mirror host 116A is depicted as including purchases table 118. Purchases table 118 is an example of a database table that the insert statements contained in database insert operation 106 may be applied to. For example, after applying mirrored insert operation 114A, purchases table 118 may include an entry with the username of "MARYM", a product ID of "94823", a quantity of "1", and a price of "24.39".

Figure 2:
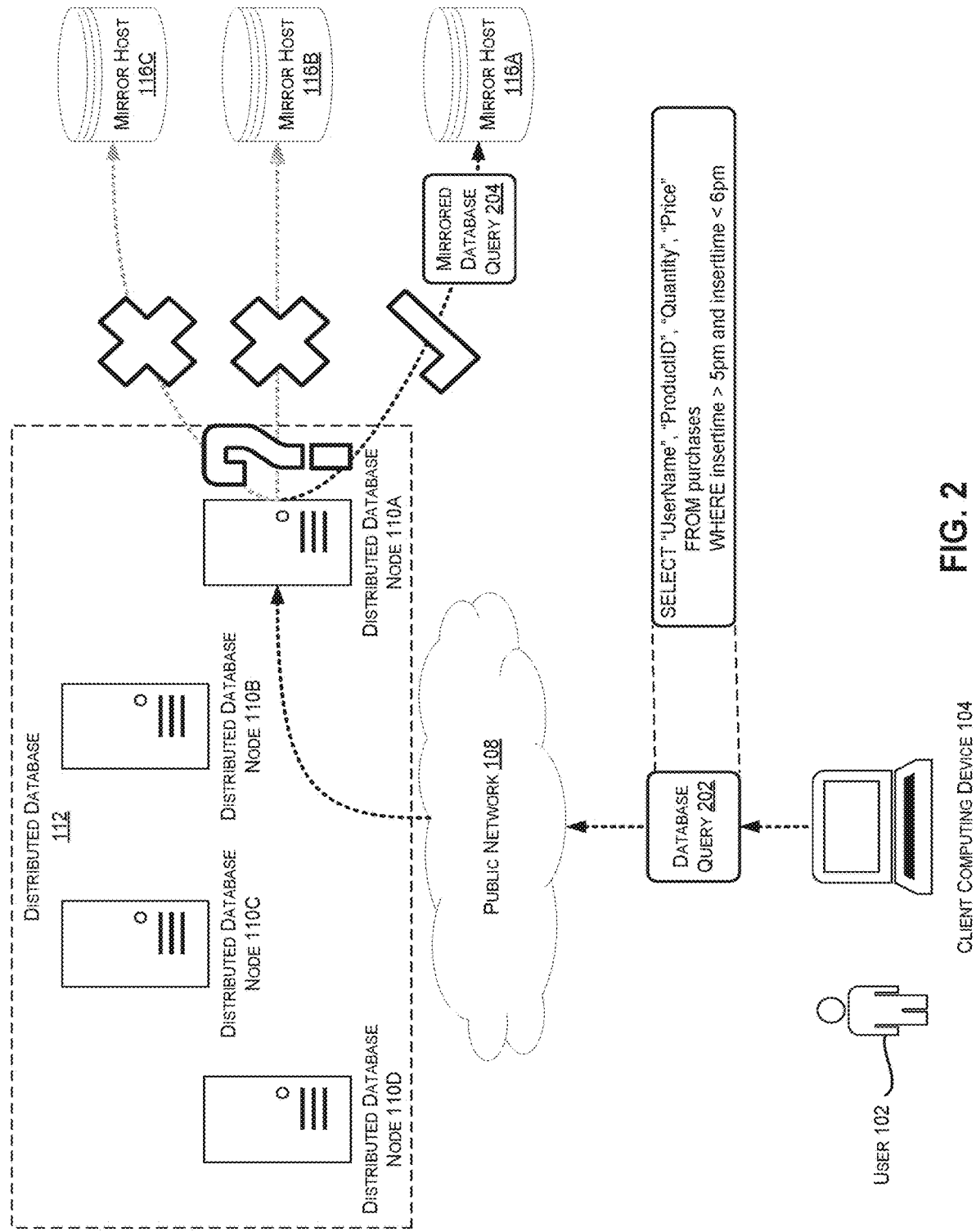
FIG. 2 is a system diagram illustrating one embodiment of selecting a mirror host to perform a mirrored database query.

FIG. 2 is a system diagram illustrating one embodiment of selecting a mirror host 116A to perform a mirrored database query 204. In some embodiments, user 102 causes client computing device 104 to send database query 202 to distributed database node 110A. Distributed database node 110A may generate mirrored database query 204 by duplicating database query 202. Throughout this document, database queries often refer to read queries, e.g. SELECT queries, while database operations/statements often refer to write queries, e.g. INSERT queries. However, it is similarly contemplated that database queries may be INSERT queries and database operations/statements may be SELECT queries.

In some embodiments, distributed database node 110A selects one of mirror hosts 116 to perform the mirrored database query 204. Various techniques are described throughout this document for selecting one of the mirror hosts 116. Briefly however, distributed database node 110A may select a mirror host that is expected to contain the largest number of database entries that were inserted during a query-specified time period. Put differently, distributed database node 110A may select a mirror host that is most likely to contain an entry that was inserted within a query-specified time period. As depicted in FIG. 2, the distributed database node 110A has selected mirror host 116A to forward the mirrored database query 204 to.

Figure 3A:
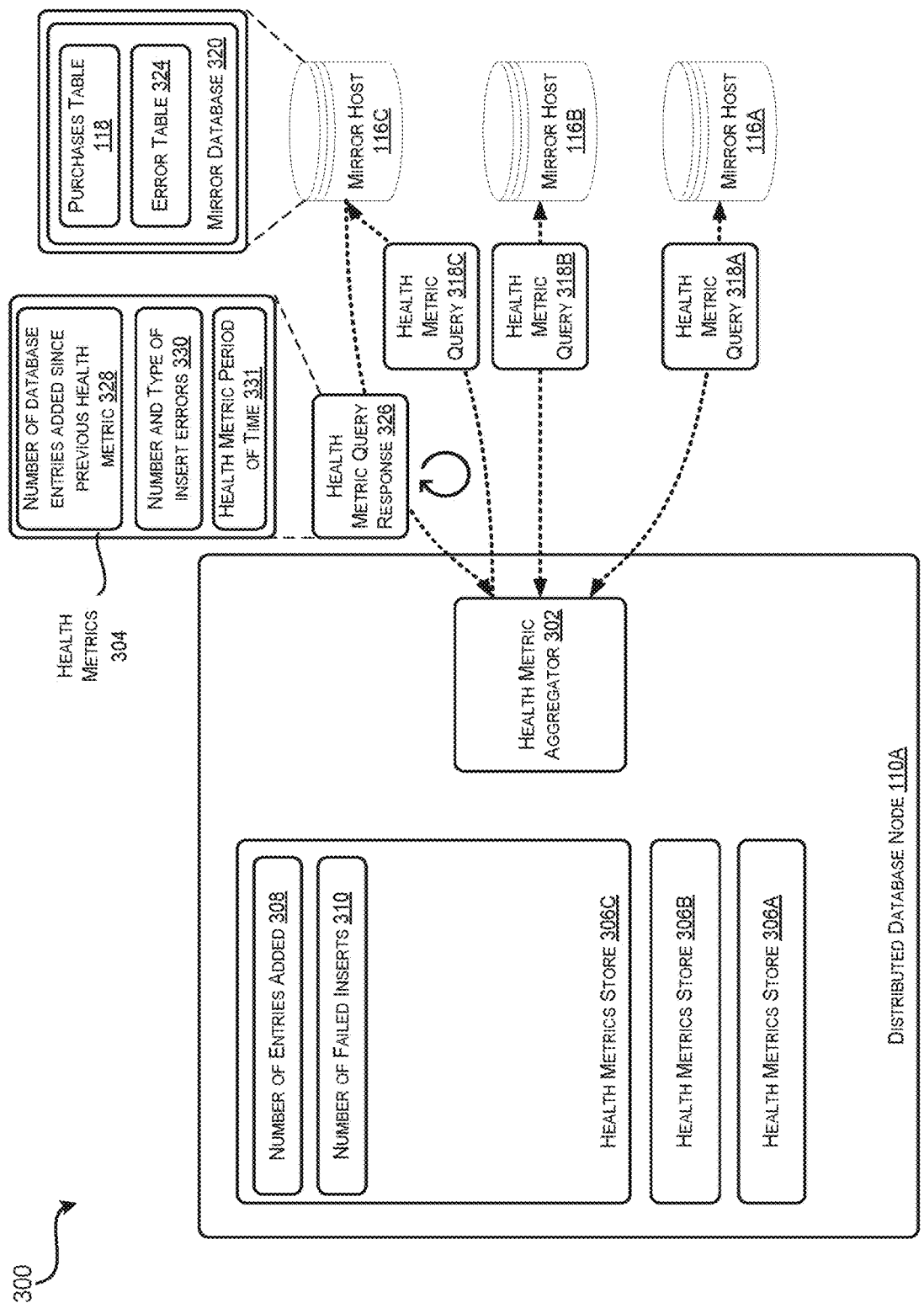
FIG. 3A is a block diagram illustrating one embodiment of a health metric aggregator periodically querying a database on a mirror host for health metrics.

FIG. 3A is a block diagram 300 illustrating one embodiment of a health metric aggregator 302 periodically querying a database 320 on mirror host 116C for health metrics 304. In some embodiments, health metrics are retrieved from mirror database 320 using a database request 118. Mirror database 320 is the same database that performs database insert operations 106 and database queries 202. In this way, database request 118 has access to the most recent database insert operation 106 and database queries 202 performed by mirror database 320. Other techniques for retrieving health metrics 304 from mirror hosts 116 are discussed below in conjunction with FIG. 3B and FIG. 3C.

By having access to mirror database 320, health metric query 318 can filter, aggregate, group, and otherwise perform any allowed query operation when generating a health metric 304. For example, health metric query 318 may query a table that contains mirrored database entries, such as purchases table 118, and count the number of database entries added since a previous health metric was generated 328. The number of database entries added since the previous health metric may be included in the health metric query response 326, along with health metric time period 331, which identifies the period of time over which the entries were added. Similarly, health metric query 318 may query error table 324 for a number and type of insert errors 330 that manifested while inserting entries since the last health metric was generated.

In some embodiments, distributed database node 110A may store health metrics received from each mirror host in a distinct location. For example health metrics store 306C includes health metrics received from mirror host 116C, while health metrics store 306B includes health metrics received from mirror host 116B. Distributed database node 110 a may further organize different types of health metrics within each health metrics store 306. For example, the number of database entries added since previous health metric 328 may be inserted as new entry in the number of entries added 308 of health metrics store 306C. Similarly, the number and type of insert errors 330 may be inserted as another entry in the number of failed inserts 310 of health metrics store 306C.

Health metric aggregator 302 may submit health metric queries 318 to mirror hosts 116 over time. Health metric queries 318 may be submitted periodically, at random points in time, or at regular intervals. Health metric aggregator 302 may submit health metric queries 318 after long intervals, or comparatively frequently. In some embodiments, health metric aggregator 302 submits health metric queries 318 every minute, although submitting health metric queries 318 is often as every few milliseconds or as infrequently as every hour or more are similarly contemplated.

By frequently submitting health metric query 318 requests, the resulting health metrics 304 represent mirror host activity over short periods of time. While high rates of health metric queries 318 may have a negative effect on the performance of mirror host 116C, the small amounts of time consumed retrieving health metrics 304 each minute enables distributed database node 110A to compute a health score for any mirror host 116 for virtually any time period.

In addition to retrieving health metrics 304 by querying mirror database 320 of mirror host 116C, health metrics 304 may be received unsolicited from mirror host 116C, i.e. not in response to a health metric query 318.

Figure 3B:
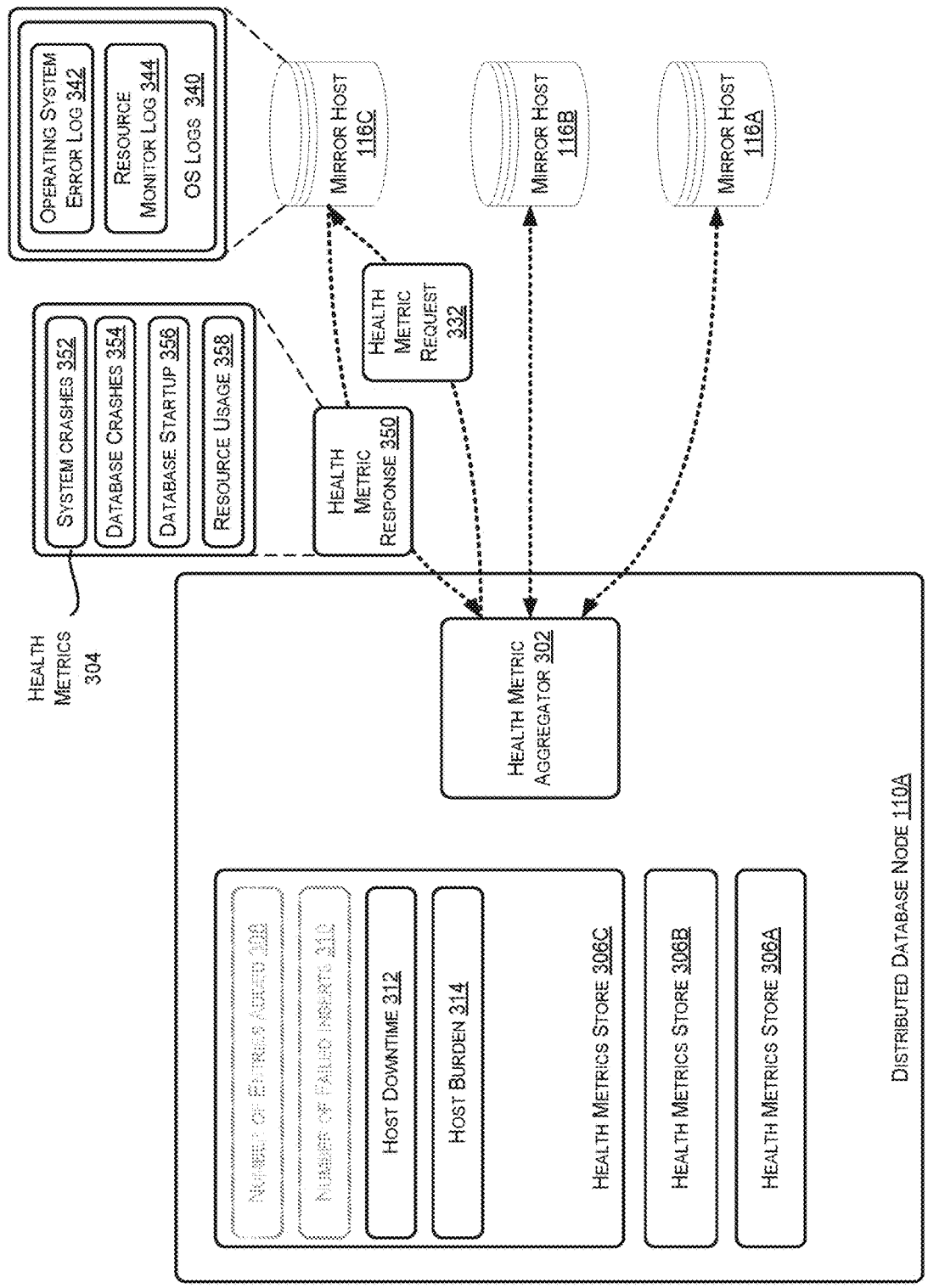
FIG. 3B is a block diagram illustrating one embodiment of a health metric aggregator periodically requesting log information from operating systems on mirror hosts.

FIG. 3B is a block diagram illustrating one embodiment of a health metric aggregator 302 periodically requesting log information from the operating system running on mirror hosts 116. In some embodiments, health metric aggregator 302 sends a health metric request 332 to mirror hosts 116. Health metric request 332 may be received by and processed by an operating system executing on mirror host 116C. The operating system may return health metric response 350 to the health metric aggregator 302.

For example, health metric request 332 may retrieve or extract data from one or more operating system logs 340. Operating system error log 342 may be read to identify health metrics 304 such as system crashes 352, database crashes 354, and database startup times 356. Health metric request 332 may also retrieve or extract data from resource monitor log 344. Resource monitor log 344 may store how much load was experienced by a particular resource, such as a hardware component, over time. Resource monitor log 344 may be analyzed to identify resource usage 358 indicating that mirror host 116C was not able to insert database entries as fast as they were received. These health metrics 304 may be returned to health metric aggregator 302 via health metrics 350.

In some embodiments, health metric aggregator 302 processes indications of system crashes 352, database crashes 354, and database startup time 356, to determine periods of time when mirror host 116C was off-line or otherwise inaccessible. For example, if operating system error log 342 indicated that a database crash occurred at 7:58 PM, and database startup 356 indicated that database had resumed operation by 8:05 PM, host downtime 312 may indicate that the database of mirror host 116C was inoperable from 7:58 to 8:05. Similarly, health metric aggregator 302 may analyze resource usage 358 to determine whether mirror host 116C was overburdened to the extent that insert operations could not be completed. For example, if a storage device on mirror host 116 was operating at 100% of capacity for more than a defined period of time, health metric aggregator 302 may determine that some queries received while the storage device was operating at 100% of capacity may not have been successfully inserted.

Figure 3C:
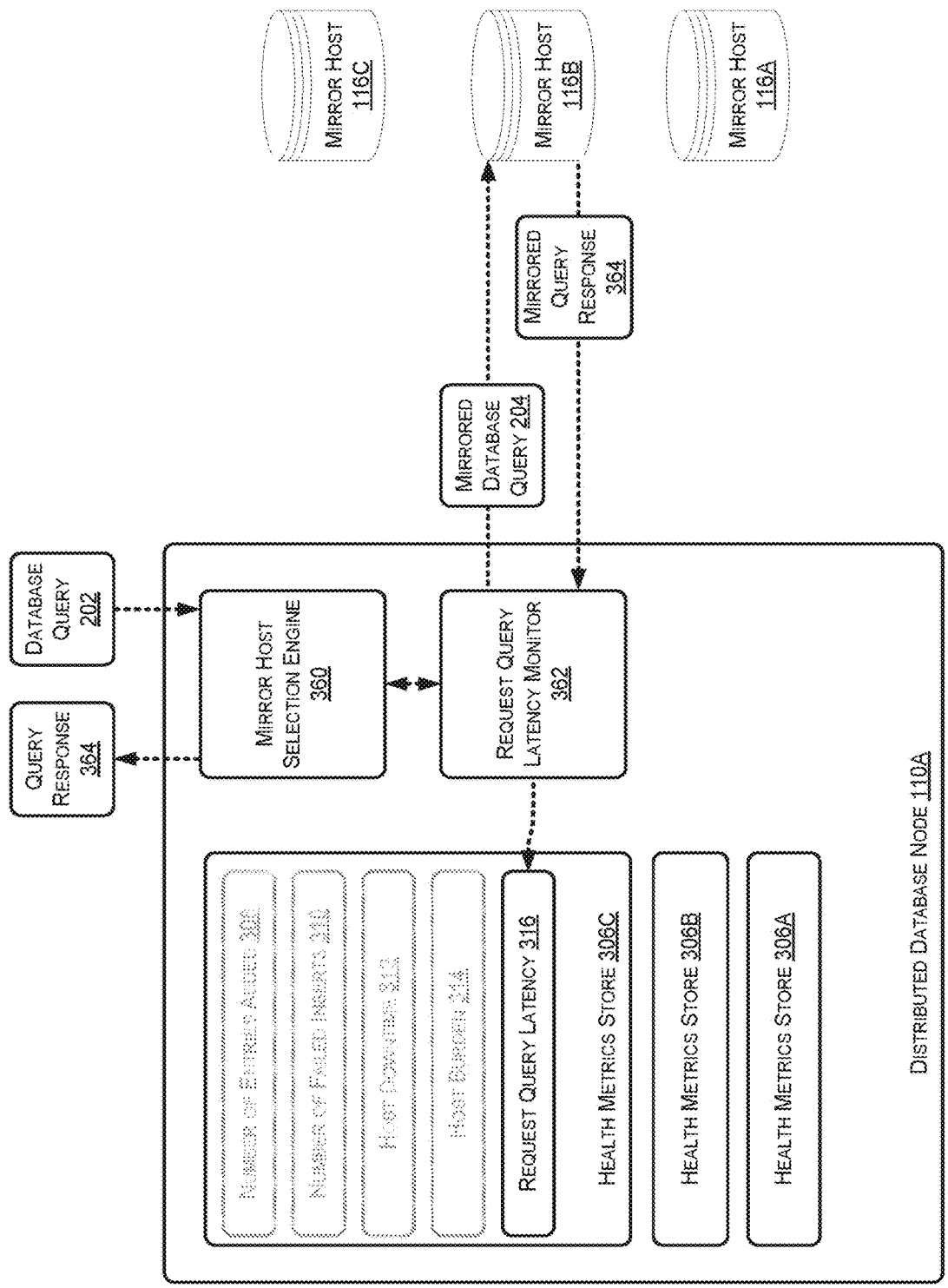
FIG. 3C is a block diagram illustrating one embodiment of a request query latency monitor measuring latency of mirrored database queries.

FIG. 3C is a block diagram illustrating one embodiment of a request query latency monitor 362 measuring latency of mirrored database queries 204. In some embodiments, database query 202 is received by mirror host selection engine 360. Mirror host selection engine 360 selects a mirror host 116 to forward database query 202 to based on health metrics store 306C. Details of how the mirror host is selected are described below in conjunction with FIG. 5A-5D.

Request query latency monitor 362 receives a mirrored database query 204 that is derived from database query 202 by mirror host selection engine 360. Request query latency monitor 362 forwards the mirrored database query 204 to mirror host 116B. Request query latency monitor 362 may note a time when mirrored database query 204 was forwarded to mirror host 116B. In other embodiments, request query latency monitor 362 may place a timestamp into the mirrored database query 204 indicating when mirrored database query 204 was forwarded to mirror host 116B. In either case, upon receiving mirrored query response 364 from mirror host 116B, request query latency monitor 362 calculates how long it took for mirror host 116B to process the mirrored database query 204. Request query latency monitor 362 may store the measured latency in request query latency 316 of health metrics store 306C.

Figure 4A:
FIG. 4A depicts a table of health metrics recorded over time for a mirror host that experienced failed inserts and high query latency.

FIG. 4A depicts a table 402A of health metrics recorded over time for mirror host 116A. As depicted, the mirror host 116A experienced failed inserts 406 from 7:58-7:59 and high query latency 408 from 7:59-8:00. In some embodiments, the table 402A is stored in health metrics store 306A of distributed database node 110A. Table 402A may include a time periods column 404. Each entry in the time period columns 404 may indicate a time period associated with that row. In this way, health metrics stored in table 402A indicate what was happening to the mirror host 116A during the time period 404. Each row in table 402A may store entries for the 'number of entries added 308' column, the 'number of failed inserts 310' column, the 'host downtime 312' column, the 'host overburdened' 314 column, and a 'request query latency 316' column.

Some of these columns may be evaluated in isolation to determine their contribution to the health score. For example, host downtime 312 inversely correlates with the health score, independent of the downtime of other hosts. Other columns, such as number of entries added 308, may be evaluated relative to health metrics of other hosts. In one embodiment, the contribution to the health score of the number of entries added 308 column is based on how many entries were added relative to the maximum number of entries added by any host 116 over the same time period. As such, even though the number of entries added from 7:56 to 7:57, 600,000, fell to 500,000 during 7:57-7:58, the contribution to the health score of host 116A may have increased if the number of entries added to other hosts fell by more.

As depicted in FIG. 4A, from 7:58 to 7:59, 24,300 inserts failed. The number of failed inserts for this time period may be obtained by querying the error table 324 of mirror database 320 for any errors that occurred from 7:58 to 7:59. The query may limit results to failures that occurred during insert statements. In another embodiment, the query may return all failures, and health metric aggregator 302 determines which errors were associated with insert statements.

As depicted in FIG. 4A, from 7:59 to 8:00, mirror host 116A experienced high average query latency –62 milliseconds. As discussed above in conjunction with FIG. 3C, the latency of database queries 106 is measured by request query latency monitor 362. Request query latency monitor 362 may measure the time between sending the mirrored database query 204 and receiving the corresponding mirrored query response 364. In some embodiments, request query latency monitor 362 measures the latency of read queries, e.g. select queries, although it is also contemplated that the latency of insert, update, and delete queries may similarly be measured and stored.

As discussed in more detail below in conjunction with FIGS. 5A-5D, distributed database node 110 may use request query latency information 316 to select a mirror host from a set of mirror hosts that have similar health scores. Specifically, distributed database node 110 may select a mirror host that has had lower latencies in the recent past—i.e. within a defined period of time of having received the database query 202. A mirror host that has had lower latencies in the recent past is more likely to have the capacity to successfully and quickly process the mirrored database query 204.

Figure 4B:
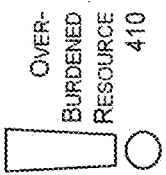
FIG. 4B depicts a table illustrating one embodiment of health metrics recorded over time for a mirror host that experienced overburdened resources.

FIG. 4B depicts a table 402B illustrating one embodiment of health metrics recorded over time for a mirror host 116B. As depicted, the mirror host 116B experienced overburdened resources 410 from 8:00 to 8:01. Similar to table 402A discussed above in conjunction with FIG. 4A, table 402B includes a time periods column 404, as well as columns for number of entries added 308, number of failed inserts 310, host downtime 312, host overburdened 314, and request query latency 316. Table 402B may be stored in health metrics store 306B.

Host overburdened metric 314 is another metric that may be evaluated independent of how much other hosts were overburdened when computing a health score. In some embodiments, a hardware component of a mirror host is considered to be overburdened if that hardware component is used at full capacity (i.e. at 100% of capacity) for more than a defined period of time. For example, a central processing unit may be considered overburdened if it operates at 100% capacity for more than 10 ms. However, these are example thresholds, and other threshold amount of capacity experienced for any other threshold amount of time is similarly contemplated. For example, a storage device may be considered overburdened if it operates at 80% capacity for any amount of time.

In some embodiments, host overburdened metric 314 indicates the amount of time that any hardware component was considered overburdened. As depicted, mirror host 116B was overburdened for 250 ms during the time period 8:00-8:01. Mirror host 116B may have been overburdened on account of a single hardware component, e.g. a processor, for the entire 250 ms. In other embodiments, multiple hardware components may have been overburdened, e.g. a processor may have been overburdened for 200 ms, while a network adapter was overburdened four 100 ms. Times during which the components were overburdened may have overlapped, e.g. for 50 ms, such that the total amount of time that mirror host 116B was overburdened was 250 ms.

Figure 4C:
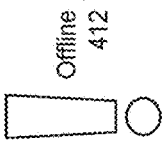
FIG. 4C depicts a table illustrating one embodiment of health metrics recorded over time for a mirror host that was offline for a portion of the time.

FIG. 4C depicts a table 402C illustrating one embodiment of health metrics recorded over time for a mirror host 116C. As depicted, mirror host 116C was offline 412 from 7:59 to 8:01, and for 400 ms of the time period from 7:58 to 7:59. Mirror host 116C could have been down for any number of reasons, known or unknown. A mirror host may be considered 'down' if it is offline, turned off, or otherwise inaccessible by distributed database node 110A. For example, mirror host 116C may have been taken down as part of scheduled maintenance. Mirror host 116C may also be down due to a crash of mirror database 320, or a crash of the system generally. Mirror host 116C may be considered off-line until it has rebooted, reconnected, or otherwise reestablished its availability to distributed database node 110A.

Figure 5A:
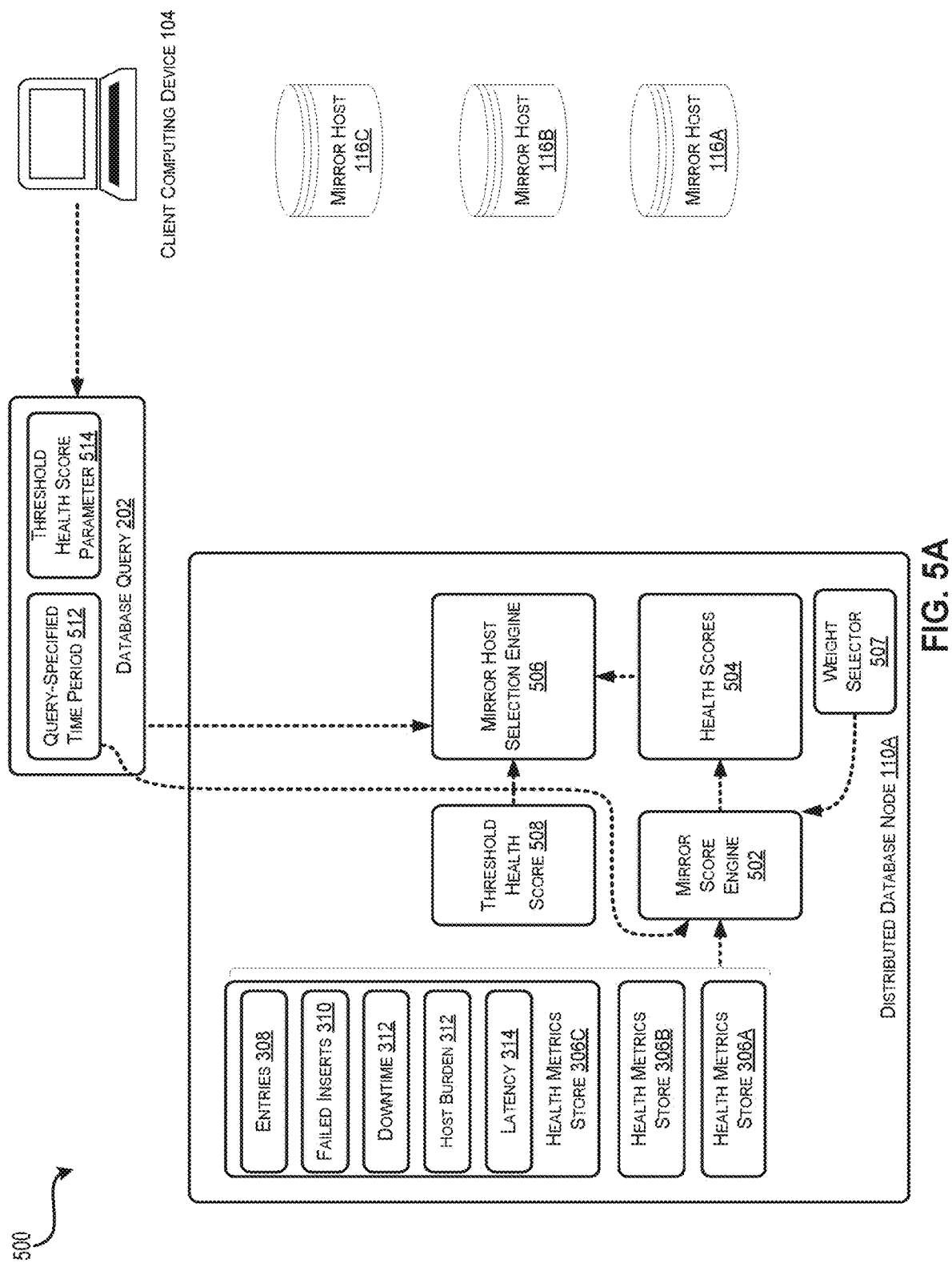
FIG. 5A is a block diagram illustrating one embodiment of a distributed database node receiving a database query from a client computing device.

FIG. 5A is a block diagram 500 illustrating one embodiment of a distributed database node 110A receiving a database query 202 from a client computing device 102. In some embodiments, database query 202 includes query-specified time period 512 and threshold health score parameter 514. The database query 202 may be received by mirror host selection engine 506. In response to the database query 202, mirror host selection engine 506 may use health scores 504 and health score threshold 508 to select one or more hosts to send a mirrored database query 204 to. In some embodiments, health scores 504 are generated by mirror score engine 502 based on health metrics 304 stored in health metrics stores 306 and query-specified time period 512.

Mirror score engine 502 may use many different techniques to generate health scores 504 from health metrics 304. In one embodiment, mirror score engine 502 may normalize health metrics 304 and aggregate the normalized health metrics to produce a health score 504. For example, to normalize the number of entries added 308 by mirror host 116C from 7:57 to 7:58, mirror score engine 502 may divide the number of entries added (500,000) by the maximum number of entries added by any of the mirror hosts during the same time period (500,000, for a normalized health metric of '1'). The result of this calculation is a value from '0' to '1', which may be aggregated with other normalized health metrics to generate the health score of mirror host 116C from 7:57 to 7:58.

Other types of health metrics 304 may be normalized in different ways. For example, the host downtime metric 312 may be normalized by computing a percentage of a time period that the mirror host was down and subtracting the result from one. For example, if a mirror host was down for 250 ms from 7:57 to 7:58, the normalized health metric would be computed as (1-250 ms/1000 ms)=0.75.

Individual normalized health metrics may be aggregated in different ways. In some embodiments, the normalized health metrics are added together to produce a health score. In other embodiments, the normalized health metrics are averaged together to produce a health score. In some embodiments, a weighted average is applied, enabling different health metrics to be valued differently when generating a health score. For example, the normalized number of entries added may be deemed more important than the amount of downtime experienced by a mirror host. In this case, the normalized number of entries added may be multiplied by a weight of two, while the normalized host downtime metric 312 may be multiplied by a weight of one, before averaging the results to generate health score 504.

In some embodiments, the weights applied to normalized health metrics may be set by an administrator or other user 102. In other embodiments, a weight selector 507 may determine how each normalized health metric is weighted. Weight selector 507 may select from a number of weighting schemes, each of which defines a weight for each normalized health metric. Weight selector 507 may select a weighting scheme for a mirror host 116 based on properties of the health metrics associated with the mirror host. For example, weight selector 507 may select a weighting scheme when a mirror host has received health metrics that are all particularly high or particularly low. Weight selector 507 may also select a weighting scheme based on the type of client computing device 102, e.g. mobile phone, laptop, server computer.

Weight selector 507 may also determine how each normalized health metric is weighted based on a number of mirror hosts 116 that are being used, a number of health metrics that have been recorded, or the like.

Query-specified time period 512 may indicate a span of time over which database query 202 is applied. Query-specified time period 512 may be defined in a WHEREIN clause of a database query that is applied to an indication of when each database entry was inserted. For example, if the time at which a database entry was inserted is stored in a "inserttime" column, query-specified time period 512 may include the clause "WHEREIN inserttime>7:57 AND inserttime<8:00" to limit the query to entries that were inserted between 7:57 and 8:00.

Figure 5B:
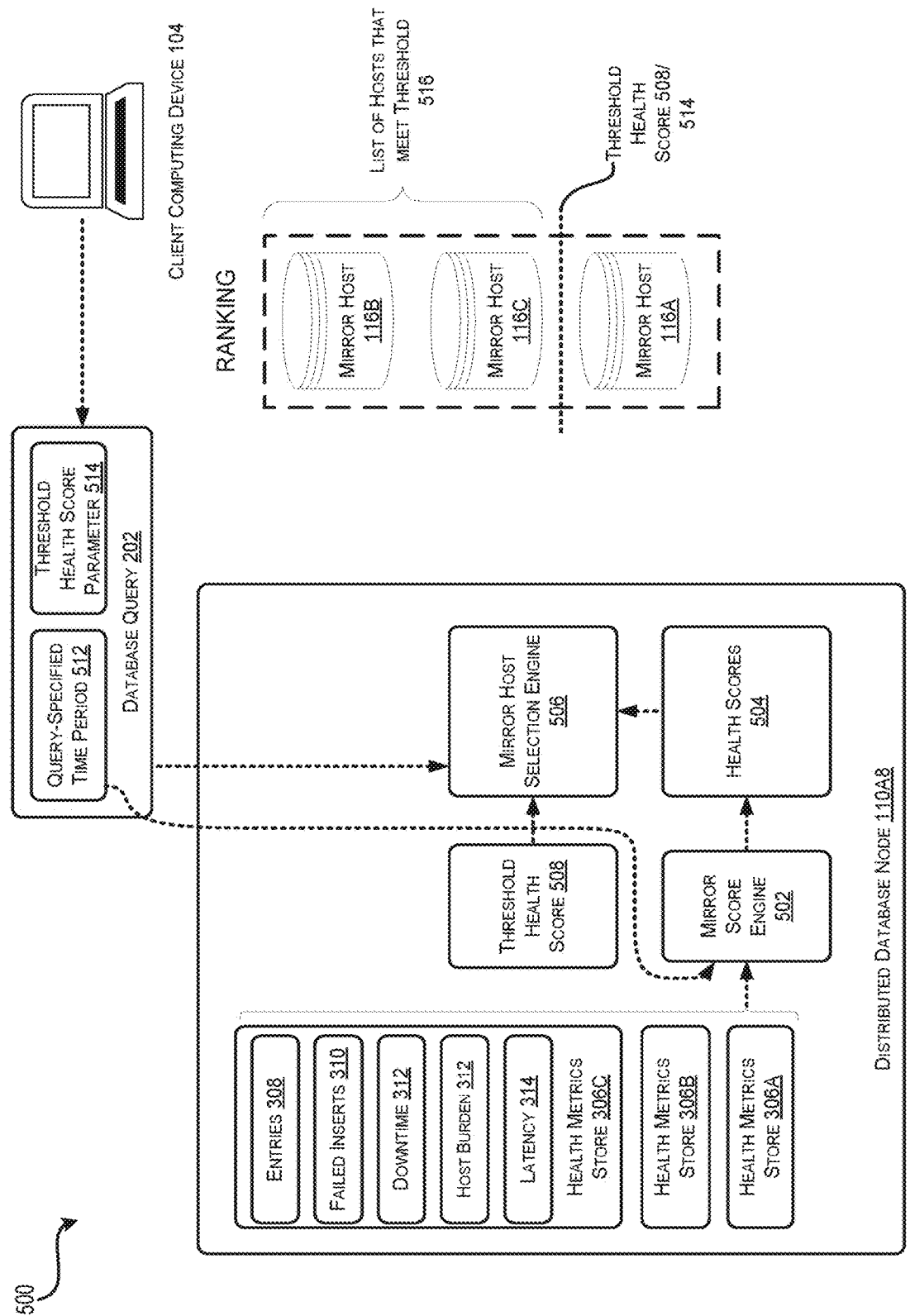
FIG. 5B is a block diagram illustrating one embodiment of a distributed database node ranking mirror hosts based on the query time period and threshold health score parameter.

FIG. 5B is a block diagram 500 illustrating one embodiment of a distributed database node 110 ranking mirror hosts based on the query-specified time period 512 and the threshold health score parameter 514. In some configurations, mirror host selection engine 506 ranks mirror hosts 116 by health score 504. As depicted, mirror host 116B ranks above mirror host 116C, which ranks above mirror host 116A.

In some embodiments, mirror host selection engine 506 applies threshold health score 508 and/or threshold health score parameter 514 to identify a list of hosts usable when responding to database query 202. By meeting a threshold health score for the query-specified time period 512, a mirror host 116 is estimated to have received, processed, and retained enough insert statements 106 to provide accurate query results. In some embodiments, threshold health score 508 is a default threshold configured by an administrator or other user. Threshold health score parameter 514 may be supplied with database query 202, and may be applied in addition to or to the exclusion of threshold health score parameter 508.

In some embodiments, a mirror host 116 may only exceed a threshold health score 508/514 for a portion of query-specified time period 512. When a mirror host 116 does not exceed the threshold health score 508/514 for the entire query-specified time period 512, a determination may be made whether to use any of the data stored in the mirror host, e.g. data that was inserted during a period of time when the mirror host did have a high health score, or whether to forgo using the mirror host entirely. For example, an administrator may determine that if the mirror host has a sub-threshold health score 504 for more than half of the query-specified time period 512, then the mirror host is considered unreliable and will not be forwarded any partition of database query 202. However, an administrator may also determine that if mirror host 116 has a high health score for any amount of time, then the mirror host may be forwarded a partition of database query 202.

Figure 5C:
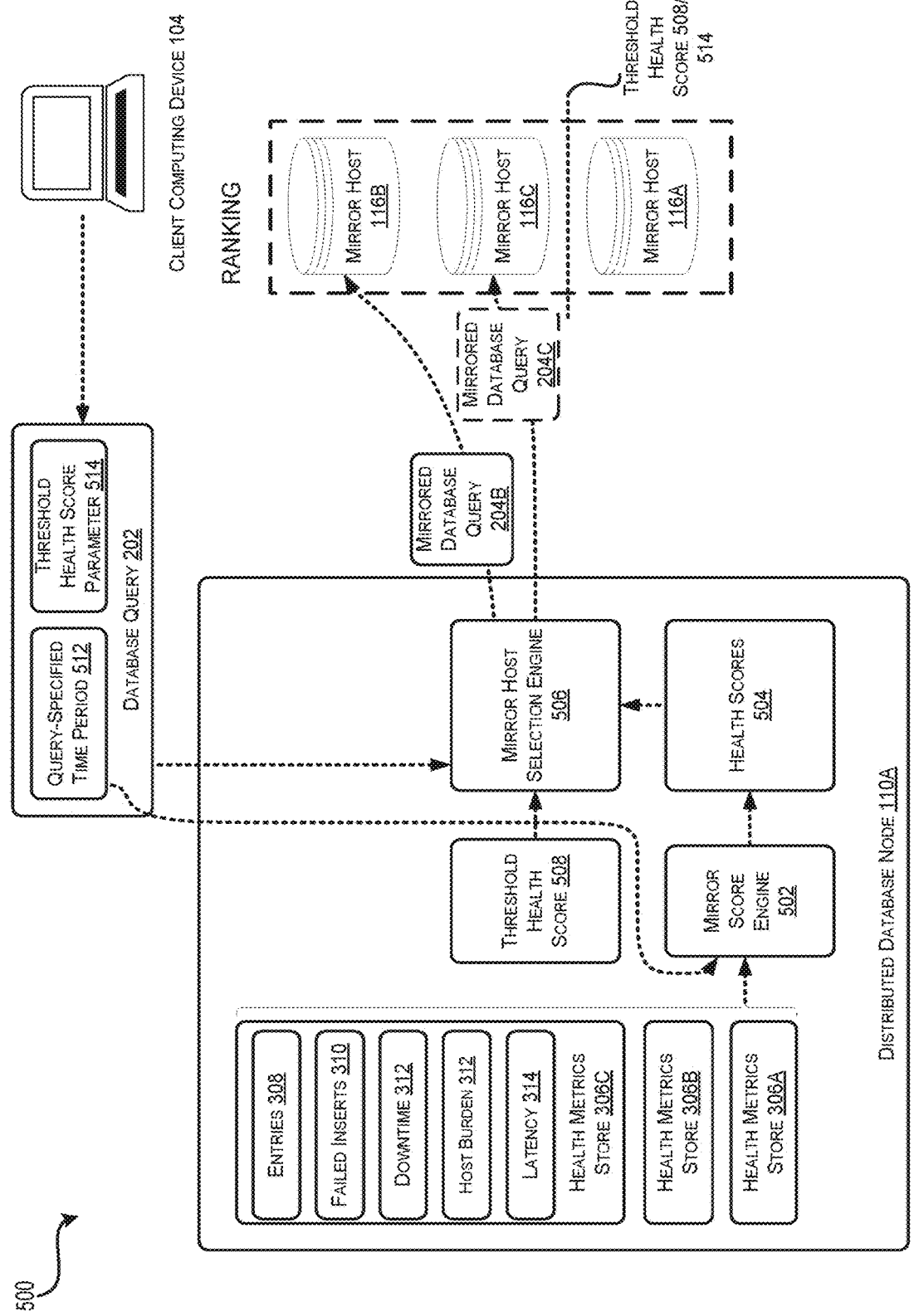
FIG. 5C is a block diagram illustrating one embodiment of a distributed database node forwarding one or more mirrored queries to one or more mirror hosts.

FIG. 5C is a block diagram 500 illustrating one embodiment of a distributed database node 110A forwarding one or more mirrored queries 204B to one or more mirror hosts 116. In some embodiments, mirror host selection engine 506 identifies a single mirror host 116B with a health score that exceeds threshold health score 508 and/or threshold health score parameter 514. In these cases, mirror host selection engine 506 may forward a single mirrored database query 204B to the single mirror host 116B.

In other embodiments, mirror host selection engine may determine that no single mirror host 116 as a health score above threshold health score 508 and/or threshold health score parameter 514 for all of query-specified time period 512. In these situations, mirror host selection engine 506 may partition database query 202 into two or more mirrored database queries, e.g. mirrored database query 204B and mirrored database query 204C, sending each of the partitioned mirrored database queries 204 to different mirror hosts 116. Mirror host selection engine 506 may analyze health scores 504 to determine when each mirror host 116 had a health score above threshold health score 508/514. Mirror host selection engine 506 may then partition database query 202 into mirrored database queries 204 based on when each mirror host at a health score that exceeded the threshold. In this way, each mirror host is used to retrieve data that was inserted during a time when that mirror host was healthy.

Figure 5D:
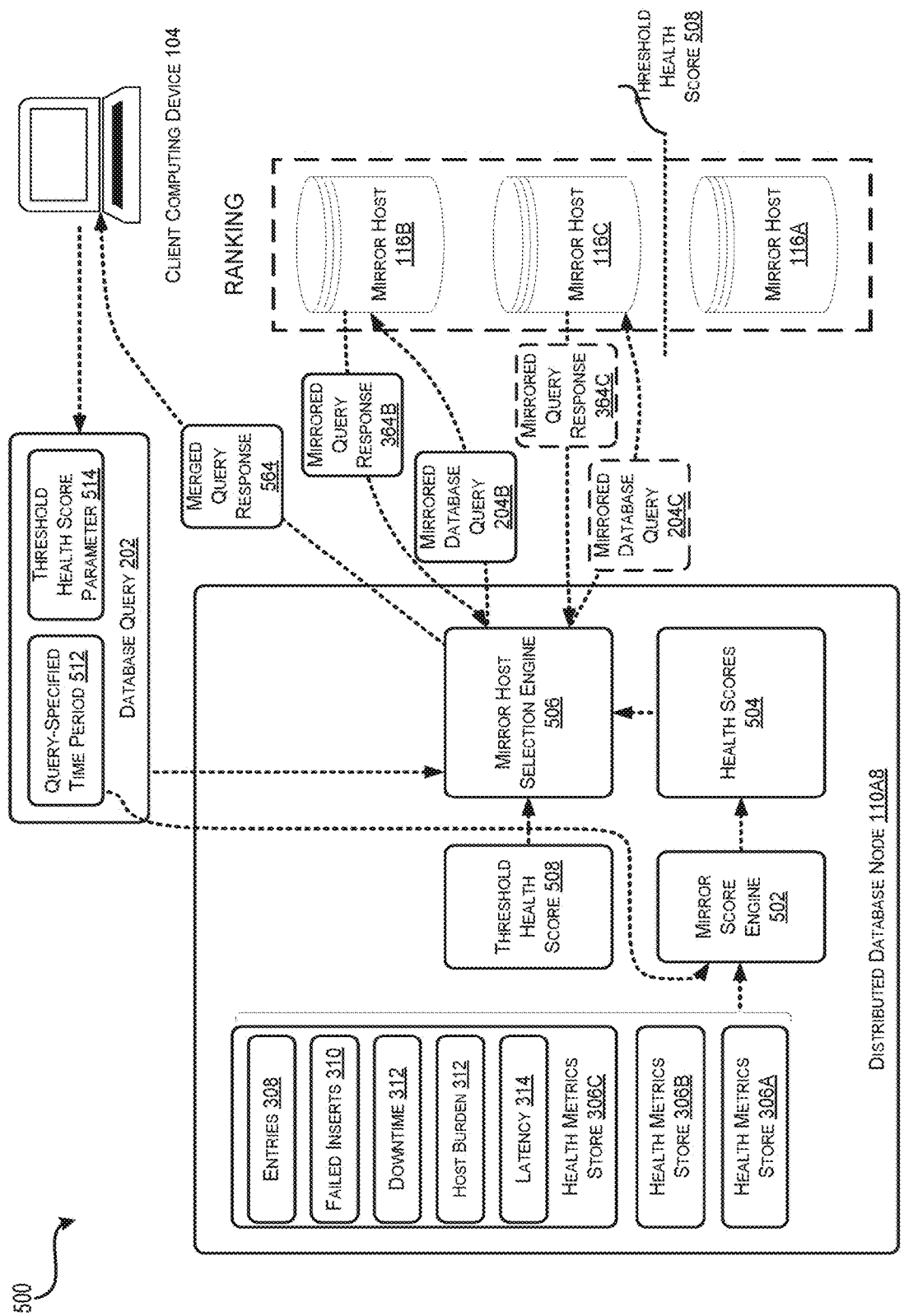
FIG. 5D is a block diagram illustrating one embodiment of a distributed database node receiving responses from one or more mirrored queries, merging the results, and providing the merged results to the client computing device.

FIG. 5D is a block diagram 500 illustrating one embodiment of a distributed database node 110A receiving responses 364 from one or more mirrored queries 204, merging the results, and providing the merged results 564 to client computing device 104. In some embodiments, the results contained in mirrored query responses 364 are appended together to form merged query response 564. Additionally, or alternatively, the results contained in mirrored query responses 364 may be unioned together. The union operation may remove duplicate entries. Duplicate entries may exist because the partitioning of database query 202 into mirrored database queries 204 may not account for an entry that was recorded as being inserted at 7:57 in one mirror host but was recorded as being inserted at 7:58 in a different mirror host, such that two mirrored database queries 204 may return the same entry.

Figure 6:
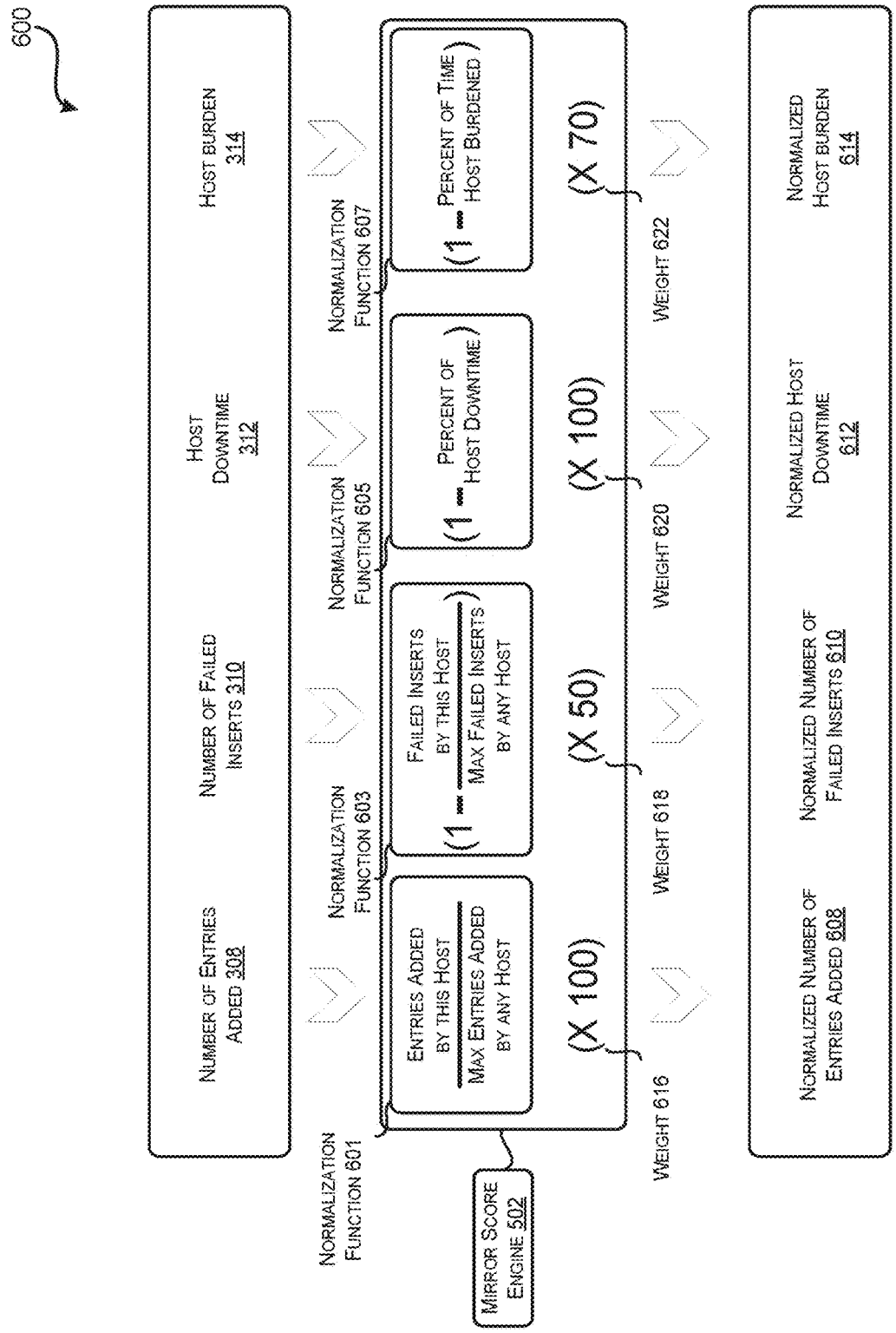
FIG. 6 is a block diagram illustrating one embodiment of a mirror score engine normalizing health metrics.

FIG. 6 is a block diagram 600 illustrating one embodiment of a mirror score engine 502 normalizing health metrics 304. As depicted, number of entries added 308, number of failed inserts 310, host downtime 312, and host burden 314 may each be processed by different normalization functions 601, 603, 605, and 607, respectively. The result of each normalization function may be weighted by corresponding weights 616, 618, 620, and 622 to produce normalized number of entries added 608, normalized number of failed inserts 610, normalized host downtime 612, and normalized host burden 614. One of ordinary skill will appreciate that the specific metrics, normalization functions, and weights used throughout this document are examples, and that any other health metrics, normalization functions and/or weights, are similarly contemplated.

In some embodiments, normalization functions 601 divides the number of entries added by the mirror host by the maximum number of entries added by any mirror host during the same time period. As such, normalization function 601 has the effect of contributing to a health score in proportion to how many entries a mirror host has in comparison to its peers. A mirror host that has the maximum number of entries added will contribute '1' to the health score, while a mirror host that only added half of the maximum number of entries contribute 0.5.

Normalization function 603 may be applied to the number of failed inserts 310. Normalization function 603 divides the number of failed inserts encountered by the host by the maximum number of failed inserts experienced by any host, and subtracts the resulting value from '1'. In this way, the more a mirror host has failed to insert entries relative to its peers, the lower the resulting health score will be.

Other normalization functions may be applied to a number of failed inserts 310, alone or in combination. While normalization function 603 depends on metrics retrieved from all hosts 116, some normalization functions applied to number of failed inserts 310 may be evaluated based on the metrics of that host 116 alone. For example a different normalization function 603 may map a range of failed inserts 310 to a hard coded normalized number of failed inserts 610. For instance, a mirror host that failed 10 or fewer times may be hardcoded as having a normalized number of failed inserts 610 of '1', indicating that 10 or fewer failures is as good as one can expect. A mirror host that failed between 11 and 20 times may be hardcoded as having a normalized number of failed inserts 610 of '0.5', while any mirror host that failed 21 or more times may be hardcoded is having a normalized number of failed inserts 610 of '0'.

In some embodiments, the ranges may be scaled or otherwise adjusted based on the duration of query-specified time period 512. For example, an acceptable number of failed inserts 310 over a query-specified time period 512 of five days may be significantly larger than the acceptable number of failed inserts 310 over a query-specified time period 512 of five minutes.

Normalization function 605 calculates a percentage of host downtime, and subtracts the percentage from '1'. In this way, a mirror host 116 that experiences a small amount of downtime will contribute a larger normalized host downtime 612 to the health score 504. Similarly, a mirror host 116 that experiences a large amount of downtime will contribute little if anything to health score 504. Normalization function 607 applies a similar formula to host burden 314 as normalization function 605—the percentage of time that a host was burdened is subtracted from '1' to generate normalized host burden 614.

In some embodiments, the outputs of normalization function 601, 603, 605, and 607 are weighted by weights 616, 618, 620, and 622, respectively. These weights may be adjusted to control how much each health metric contributes to the health score 504 of the mirror host 116.

Figure 7A:
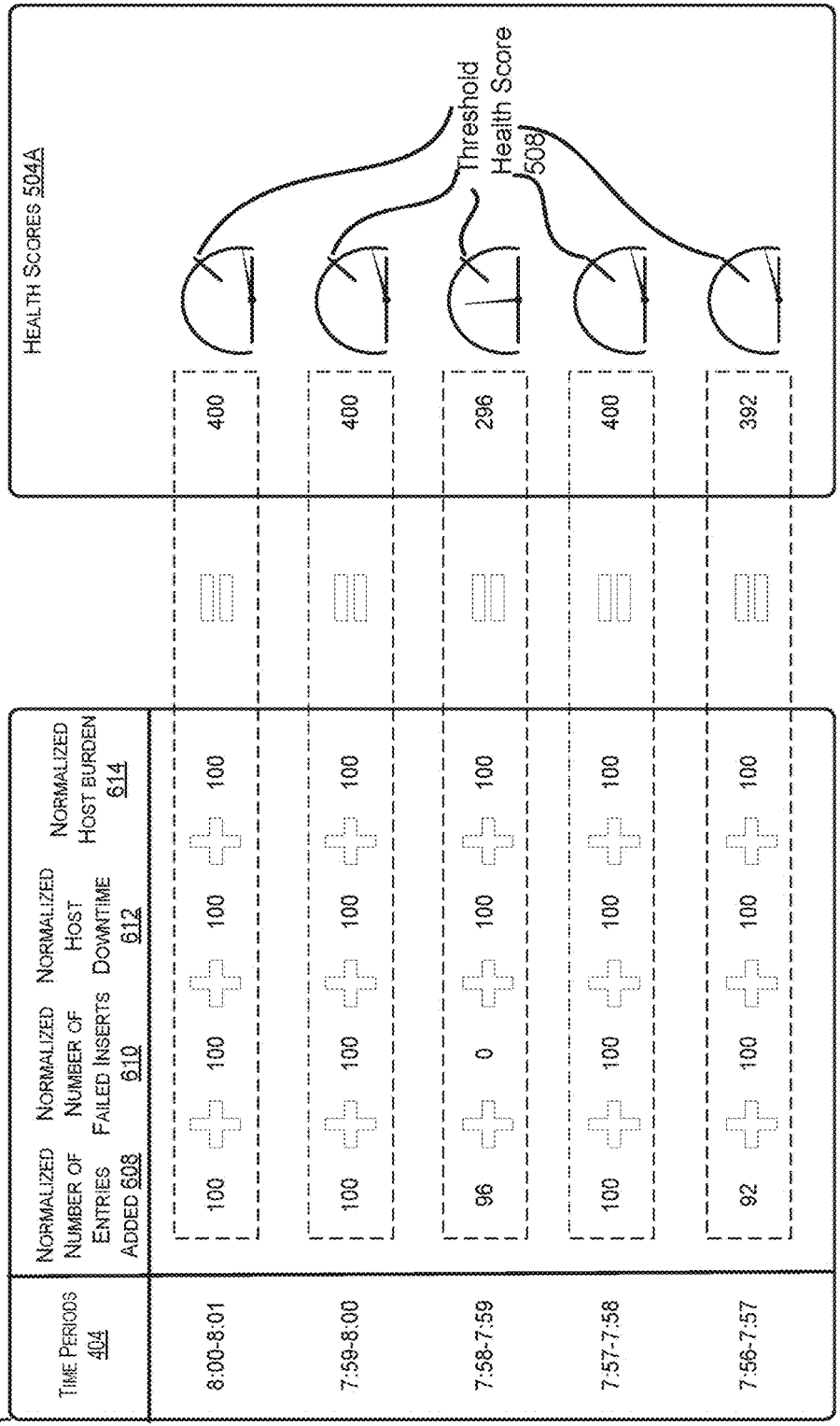
FIG. 7A is a block diagram illustrating one embodiment of a mirror score engine calculating health scores for a mirror host for a number of time periods.

FIG. 7A is a block diagram 700 illustrating one embodiment of mirror score engine 502 calculating health scores 504A for a mirror host 116A for a number of time periods 404. Normalized health metrics table 702A depicts normalized health metrics from different periods of time, e.g. 7:56 to 7:57, 7:57 to 7:58, 7:58 to 7:59, etc., and how these normalized health metrics are aggregated to generate health scores associated with these periods of time.

For example, the time period from 7:58 to 7:59 adds a normalized number of entries added 608 of 96, a normalized number of failed inserts 610 of zero, a normalized host downtime 612 of 100, and a normalized host burden 614 of 100, resulting in a health score of 296 for this time period. As depicted, the health score of 296 falls short of threshold health score 508. Similarly, the time period from 7:56 to 7:57 adds a normalized number of entries added 608 of 92, a normalized number of failed inserts 610 of 100, a normalized host downtime 612 of 100, and a normalized host burden 614 of 100 resulting in a health score of 392. As depicted, this health score exceeds the threshold health score 508 of '350'.

Figure 7B:
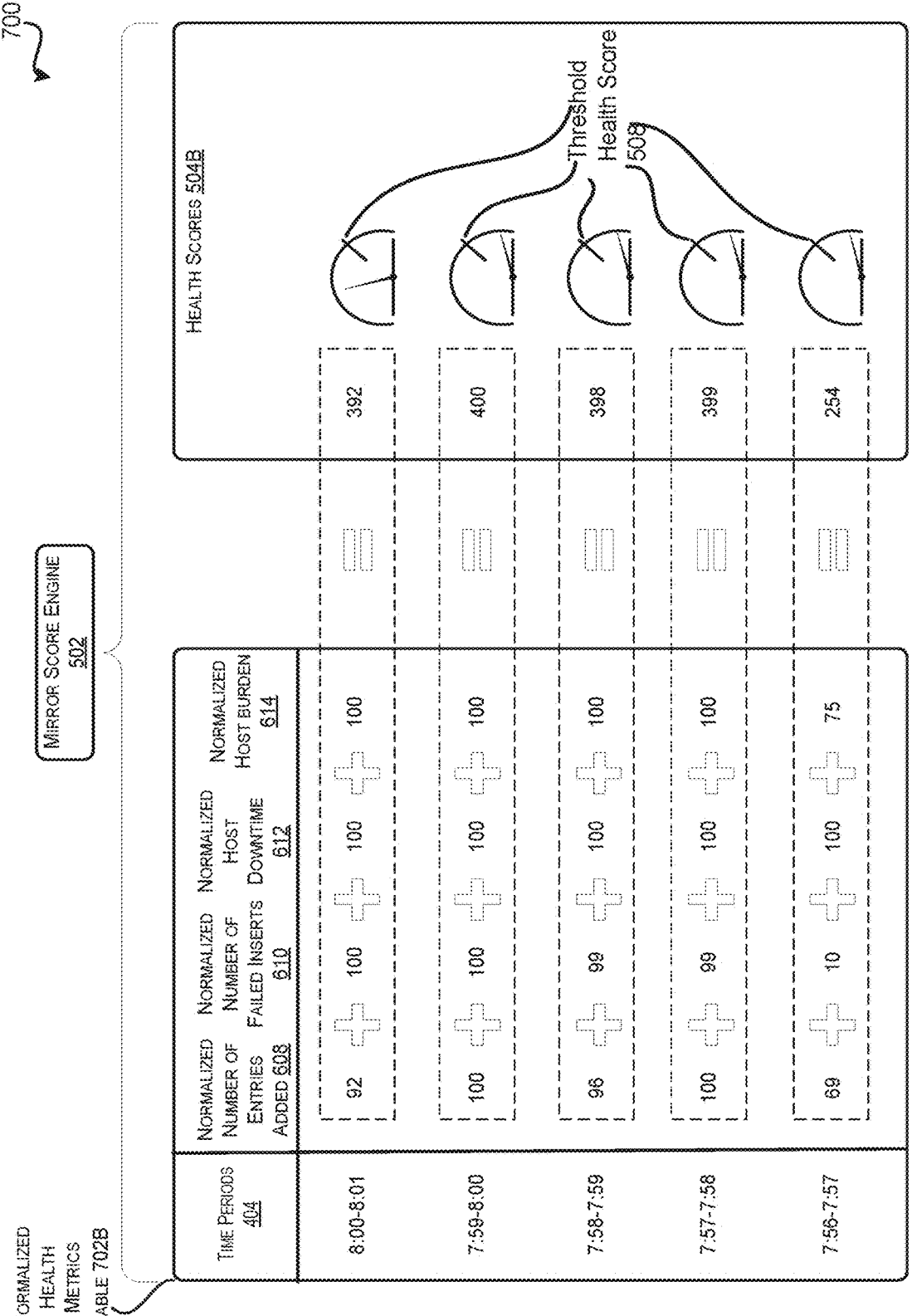
FIG. 7B is a block diagram illustrating one embodiment a mirror score engine calculating health scores for a mirror host for a number of time periods.

FIG. 7B is a block diagram 700 illustrating one embodiment of mirror score engine 502 calculating health scores 504B for a mirror host 116B for a number of time periods 404. In some embodiments, normalized health metrics table 702B depicts normalized health metrics from different periods of time. Normalized health metrics table 702B also depicts how normalized health metrics are aggregated into health scores 504B.

Figure 7C:
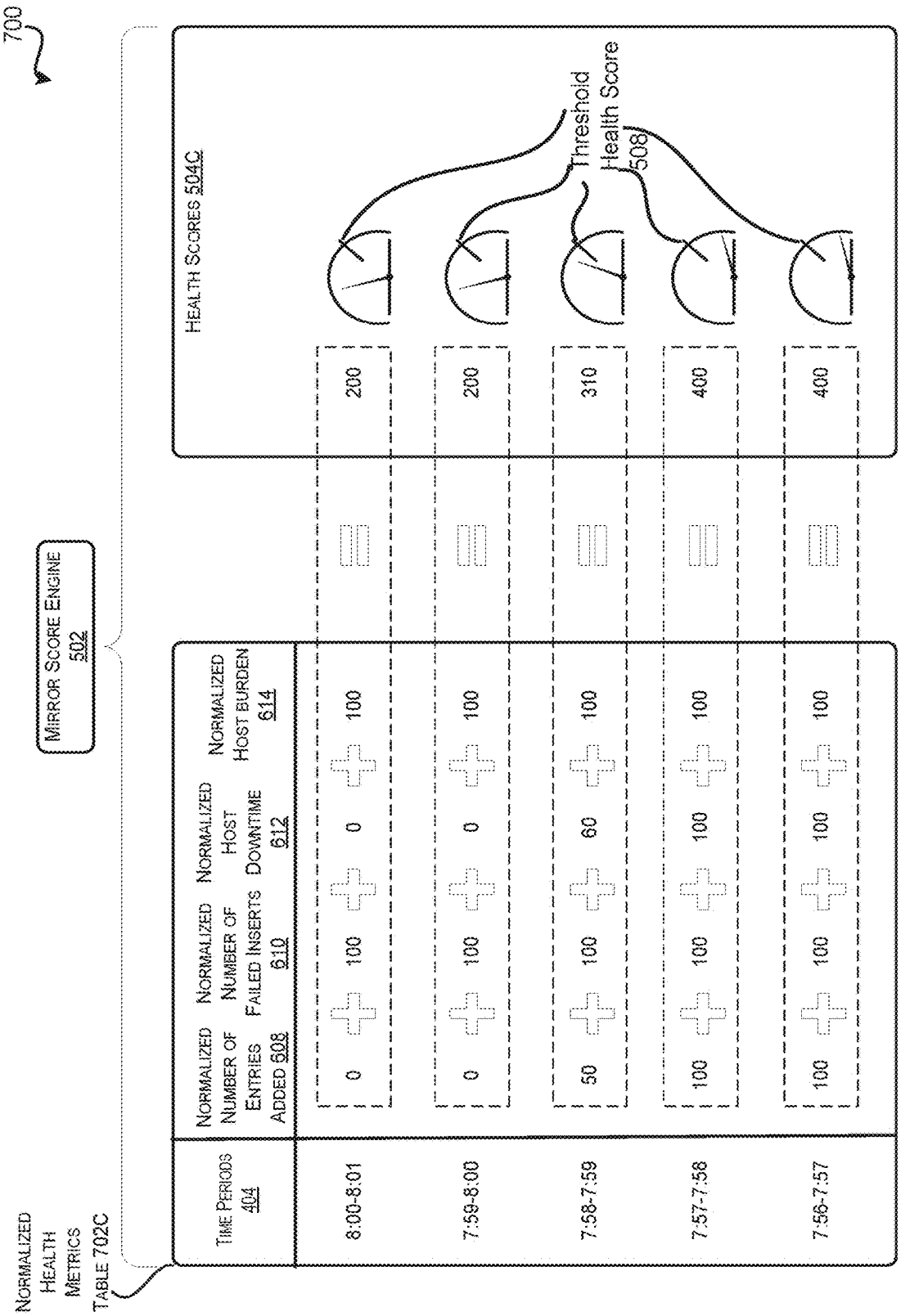
FIG. 7C is a block diagram illustrating one embodiment a mirror score engine calculating health scores for a mirror host for a number of time periods.

FIG. 7C is a block diagram 700 illustrating one embodiment of mirror score engine 502 calculating health scores 504C for a mirror host 116C for a number of time periods 404. In some embodiments, normalized health metrics table 702C depicts normalized health metrics from different periods of time. Normalized health metrics table 702C also depicts how normalized health metrics are aggregated into health scores 504C.

Figure 8:
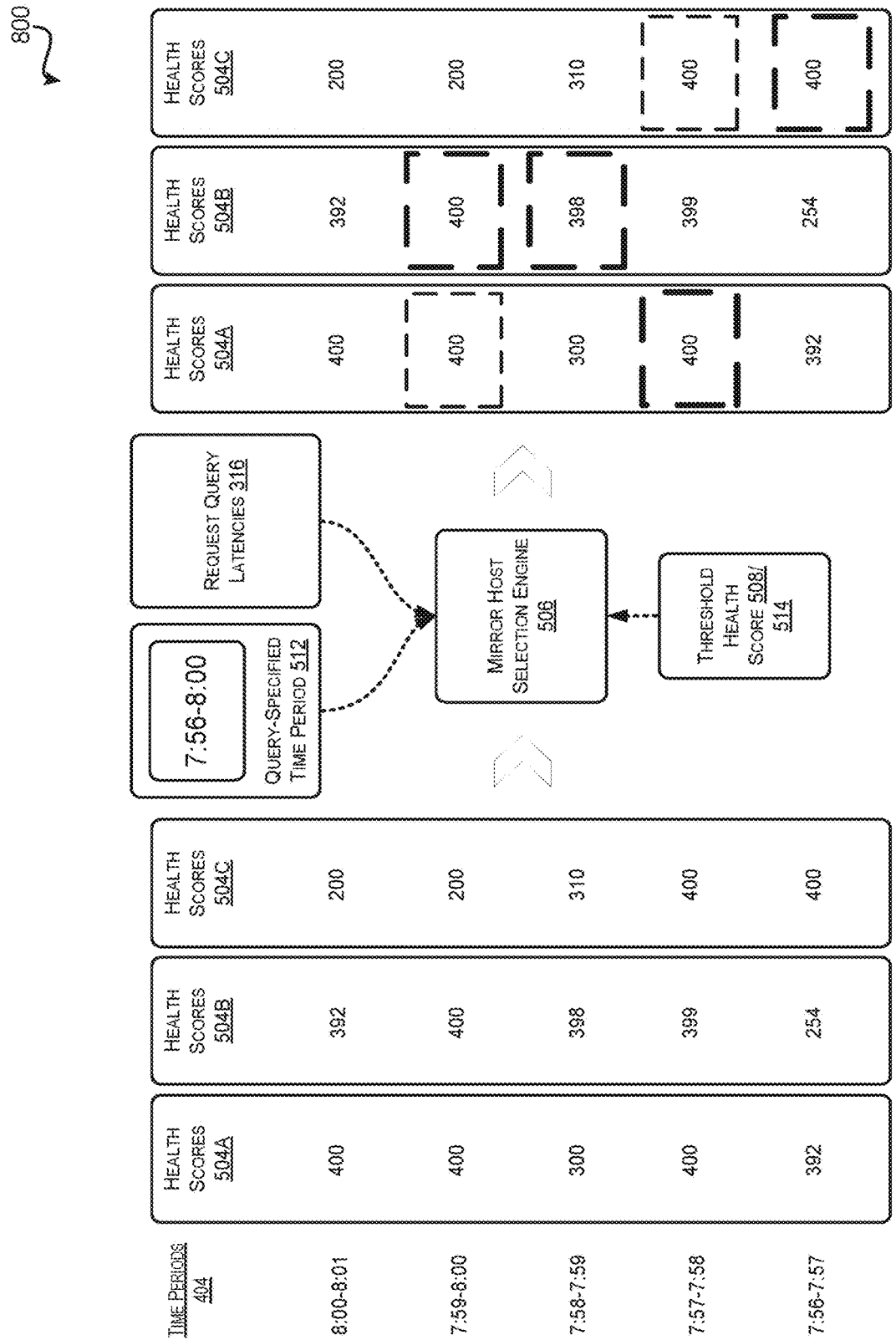
FIG. 8 is a block diagram illustrating one embodiment of a mirror host selection engine selecting which mirror host to query for a given time period.

FIG. 8 is a block diagram 800 illustrating one embodiment of mirror host selection engine 506 selecting which mirror host or mirror hosts 116 to query for a given query-specified time period 512. As depicted, query-specified time period 512 is from 7:56 to 8:00, and so the health scores associated with any time before 7:56 or any time after 8:00 are ignored. Mirror host selection engine 506 may analyze the health scores of the remaining time periods to determine if a single mirror host exceeded one or both of health scores 508/514. As depicted, if the applicable threshold health score 508 was 275, then mirror host 116A could be selected as a single mirror host to forward the database query 202.

However, if the applicable threshold health score 508 was 350, then no single mirror host would have health scores exceeding the threshold for the duration of query-specified time period 512. As such, mirror host selection engine 506 will partition the database query 202 into multiple mirrored database queries 204A, 204B, etc. each of the mirrored database queries will have conditions limiting the results to time periods when the targeted mirror host had a health score greater than the threshold health score 508/514. As depicted, mirrored database query 204A, which will be sent to mirror host 116A, will retrieve database entries that were inserted between 7:57 and 7:58. Similarly, mirrored database query 204B will retrieve database entries that were inserted between 7:58 and 8:00. Mirrored database query 204C will retrieve database entries that were inserted between 7:56 and 7:57.

In some configurations, request query latencies 316 are used to break ties between mirror hosts. For example, mirror host 116A and mirror host 116B both have health scores of 400 from 7:59 to 8:00. As depicted in FIG. 4A, mirror host 116A has a query latency of 62 ms from 7:59 to 8:00. This is significantly more than the corresponding request query latency 316 measured for mirror host 116B during this same time period: 12 ms. As such, mirror host selection engine 506 elects to query mirror host 116B, allowing mirror host 116A more time to recover from the period of high latency.

Figure 9:
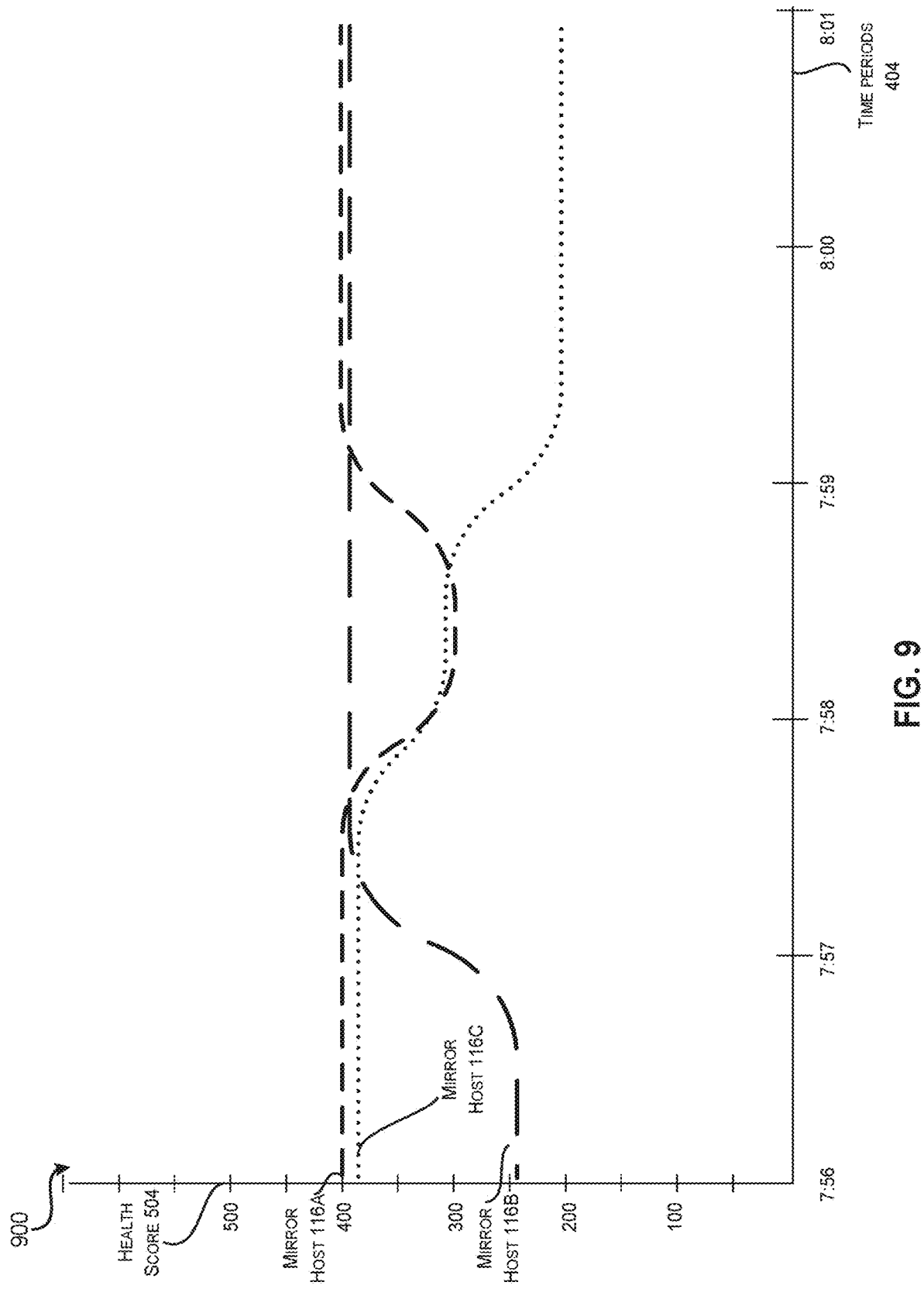
FIG. 9 is a line graph 900 illustrating how health scores from different mirror hosts change over time.

FIG. 9 is a line graph 900 illustrating how health scores from different mirror hosts change over time. Graph 900 depicts health score 504 on the vertical axis and time periods 404 on the horizontal axis. Each dotted line represents the health score generated for a particular mirror host overtime.

Figure 10:
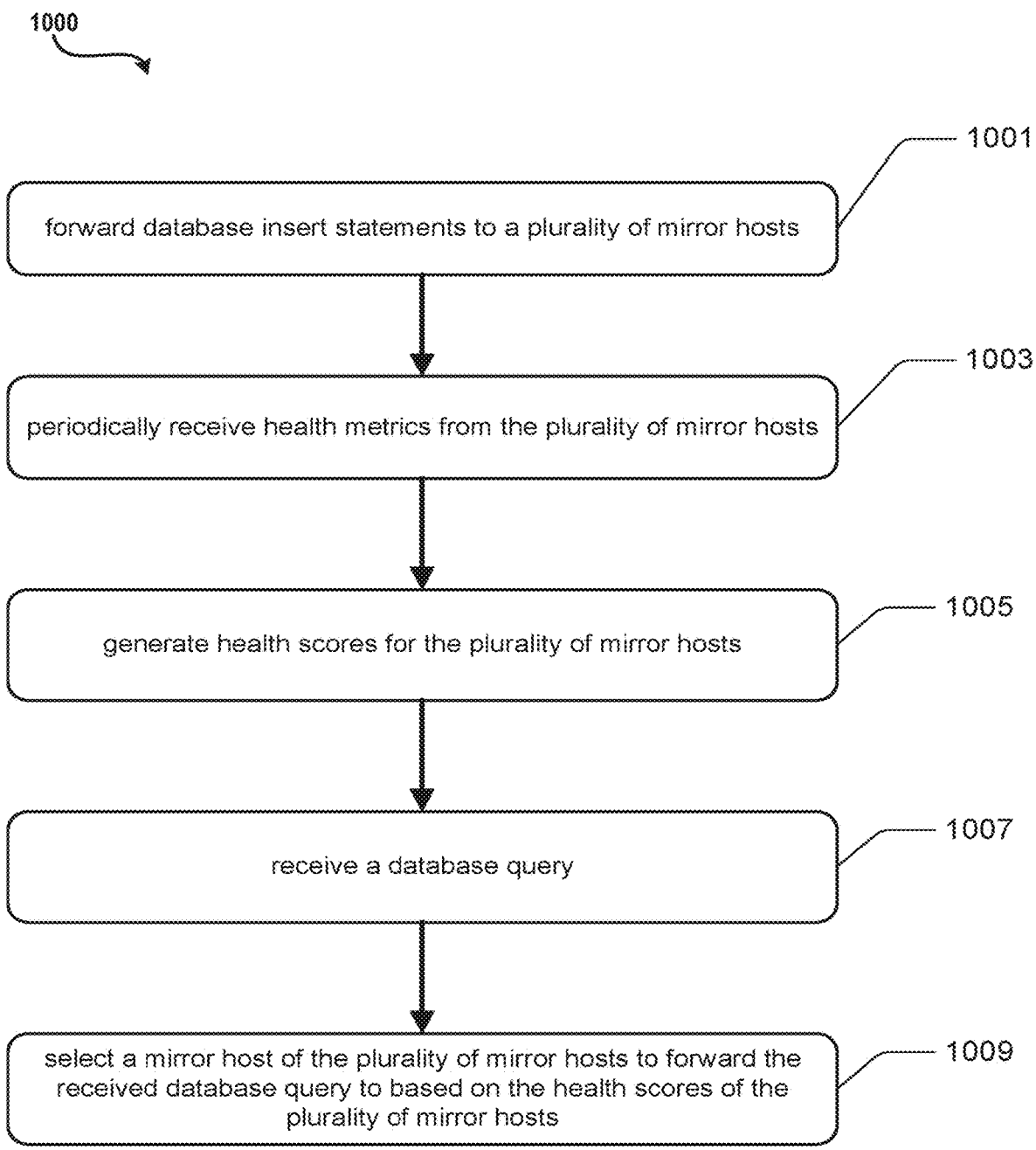
FIG. 10 is a flow diagram showing aspects of an illustrative routine, according to one embodiment disclosed herein.

FIG. 10 is a flow diagram illustrating aspects of a routine 1000 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 1000 begins at operation 1001, which illustrates forwarding database insert statements to a plurality of mirror hosts. The forwarded database insert statements may be the database insert statements 106 as discussed above in conjunction with FIG. 1.

The routine 1000 then proceeds to operation 1003, which illustrates periodically receiving health metrics from the plurality of mirror hosts. Operation 1003 may be performed by health metric aggregator 302 as discussed above in conjunction with FIG. 3B.

The routine 1000 then proceeds to operation 1005, which illustrates generating health scores for the plurality of mirror hosts. Operation 1005 may be performed by mirror score engine 502 discussed above in conjunction with FIG. 5A.

The routine 1000 then proceeds to operation 1007, which illustrates receiving a database query from a client computing device. Operation 1007 may be performed by mirror host selection engine 506, as discussed above in conjunction with FIG. 5A.

The routine 1000 then proceeds to operation 1009, which illustrates selecting a mirror host of the plurality of mirror hosts to forward the received database query to based on the health scores of the plurality of mirror hosts. Operation 1009 may also be performed by mirror host selection engine 506, as discussed above in conjunction with FIG. 5D.

Figure 11:
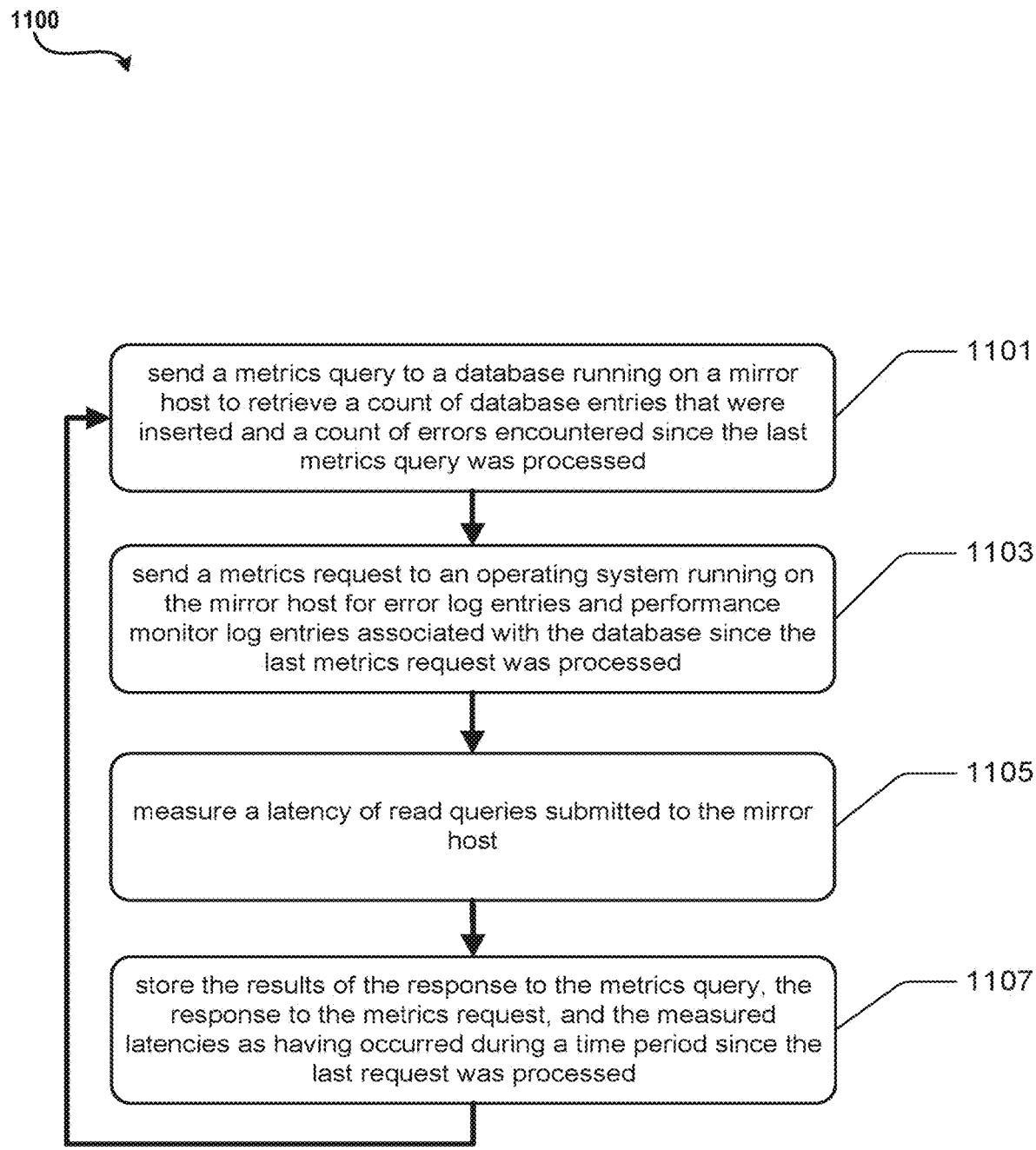
FIG. 11 is a flow diagram showing aspects of an illustrative routine, according to one embodiment disclosed herein.

FIG. 11 is a diagram illustrating aspects of a routine 1100 for implementing some of the techniques disclosed herein.

The routine 1100 begins at operation 1101, which illustrates sending a metrics query 318 to a database 320 running on a mirror host 116 to retrieve a count of database entries that were inserted since the last metrics query was processed 328 and a count of errors encountered since the last metrics query was processed 330. The routine 1100 then proceeds to operation 1103, which illustrates sending a metrics request 332 to an operating system running on the mirror host 116 to retrieve error log entries 342 and performance monitor log entries 344 associated with the database 320 since the last metrics request 332 was processed.

The routine 1100 then proceeds to operation 1105, which illustrates measuring a latency 316 of read queries 202 submitted to the mirror host 116.

Figure 12:
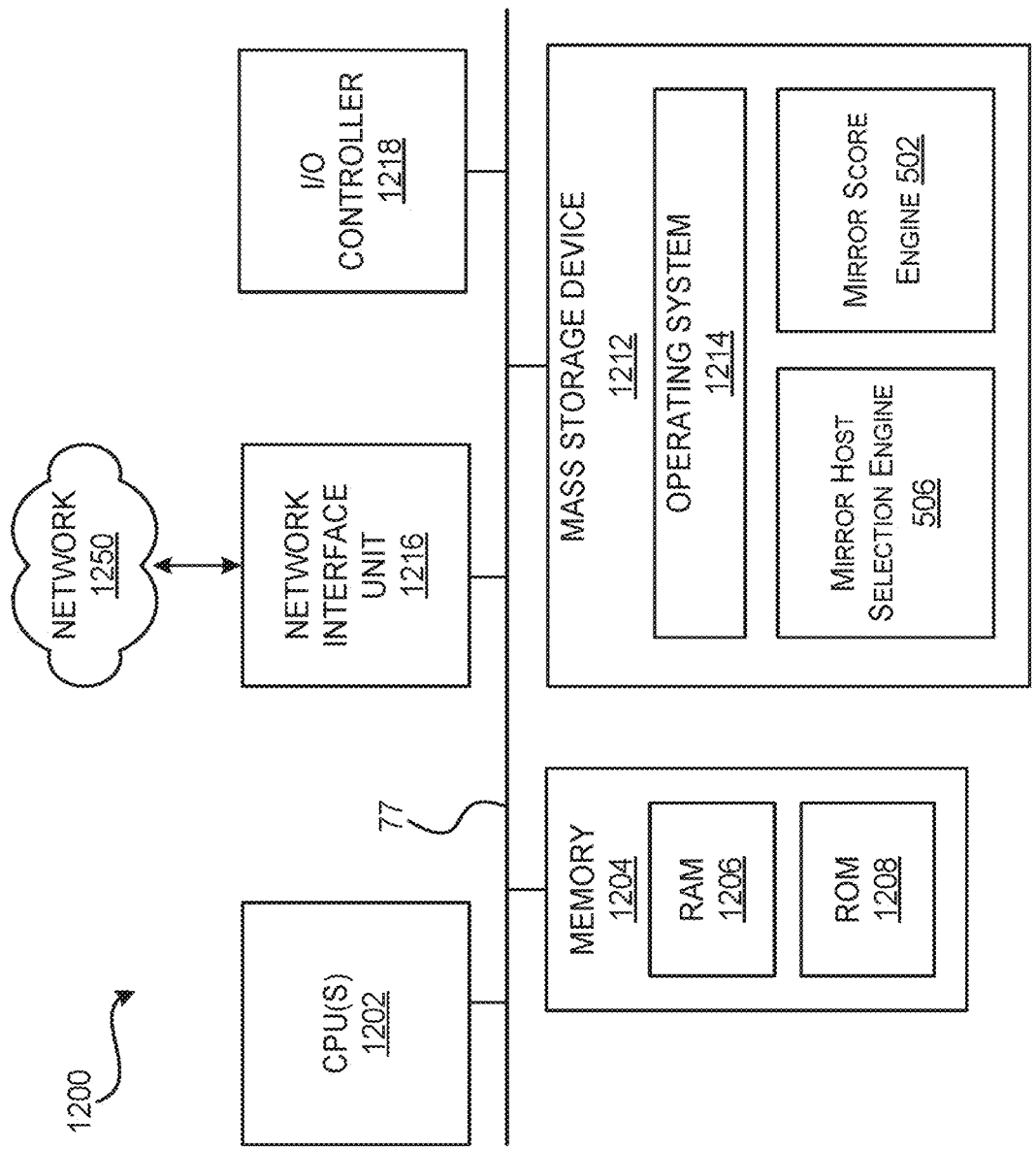
FIG. 12 is a computer architecture diagram illustrating aspects of an example computer architecture for a computer capable of executing the software components described herein.

The routine 1100 then proceeds to operation 1107, which illustrates storing the response to the metrics query 326, the response to the metrics request 350, and the measured latencies 316 as having occurred during a time period since the last request was processed FIG. 12 shows an example computer architecture for a computer capable of providing the functionality described herein such as, for example, a computing device configured to implement the functionality described above with reference to FIGS. 1-11. Thus, the computer architecture 1200 illustrated in FIG. 12 illustrates an architecture for a server computer or another type of computing device suitable for implementing the functionality described herein. The computer architecture 1200 might be utilized to execute the various software components presented herein to implement the disclosed technologies.

The computer architecture 1200 illustrated in FIG. 12 includes a central processing unit 1202 ("CPU"), a system memory 1204, including a random-access memory 1206 ("RAM") and a read-only memory ("ROM") 1208, and a system bus 77 that couples the memory 1204 to the CPU 1202. A firmware containing basic routines that help to transfer information between elements within the computer architecture 1200, such as during startup, is stored in the ROM 1208. The computer architecture 1200 further includes a mass storage device 1212 for storing an operating system 1214, other data, and one or more executable programs, such as mirror host selection engine 506 and mirror score engine 502.

The mass storage device 1212 is connected to the CPU 1202 through a mass storage controller (not shown) connected to the bus 77. The mass storage device 1212 and its associated computer-readable media provide non-volatile storage for the computer architecture 1200. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 1200.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes of the claims, the phrase "computer storage medium," "computer-readable storage medium" and variations thereof, does not include waves, signals, and/or other transitory and/or intangible communication media, per se.

According to various implementations, the computer architecture 1200 might operate in a networked environment using logical connections to remote computers through a network 1250 and/or another network (not shown). A computing device implementing the computer architecture 1200 might connect to the network 1250 through a network interface unit 1216 connected to the bus 77. It should be appreciated that the network interface unit 1216 might also be utilized to connect to other types of networks and remote computer systems.

The computer architecture 1200 might also include an input/output controller 1218 for receiving and processing input from a number of other devices, including a keyboard, mouse, or electronic stylus (not shown in FIG. 12). Similarly, the input/output controller 1218 might provide output to a display screen, a printer, or other type of output device (also not shown in FIG. 12).

It should be appreciated that the software components described herein might, when loaded into the CPU 1202 and executed, transform the CPU 1202 and the overall computer architecture 1200 from a general-purpose computing system into a special-purpose computing system customized to facilitate the functionality presented herein. The CPU 1202 might be constructed from any number of transistors or other discrete circuit elements, which might individually or collectively assume any number of states. More specifically, the CPU 1202 might operate as a finite-state machine, in response to executable instructions contained within the software modules disclosed herein. These computer-executable instructions might transform the CPU 1202 by specifying how the CPU 1202 transitions between states, thereby transforming the transistors or other discrete hardware elements constituting the CPU 1202.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1200 in order to store and execute the software components presented herein. It also should be appreciated that the computer architecture 1200 might include other types of computing devices, including hand-held computers, embedded computer systems, personal digital assistants, and other types of computing devices known to those skilled in the art.

It is also contemplated that the computer architecture 1200 might not include all of the components shown in FIG. 12, might include other components that are not explicitly shown in FIG. 12, or might utilize an architecture completely different than that shown in FIG. 12. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 13:
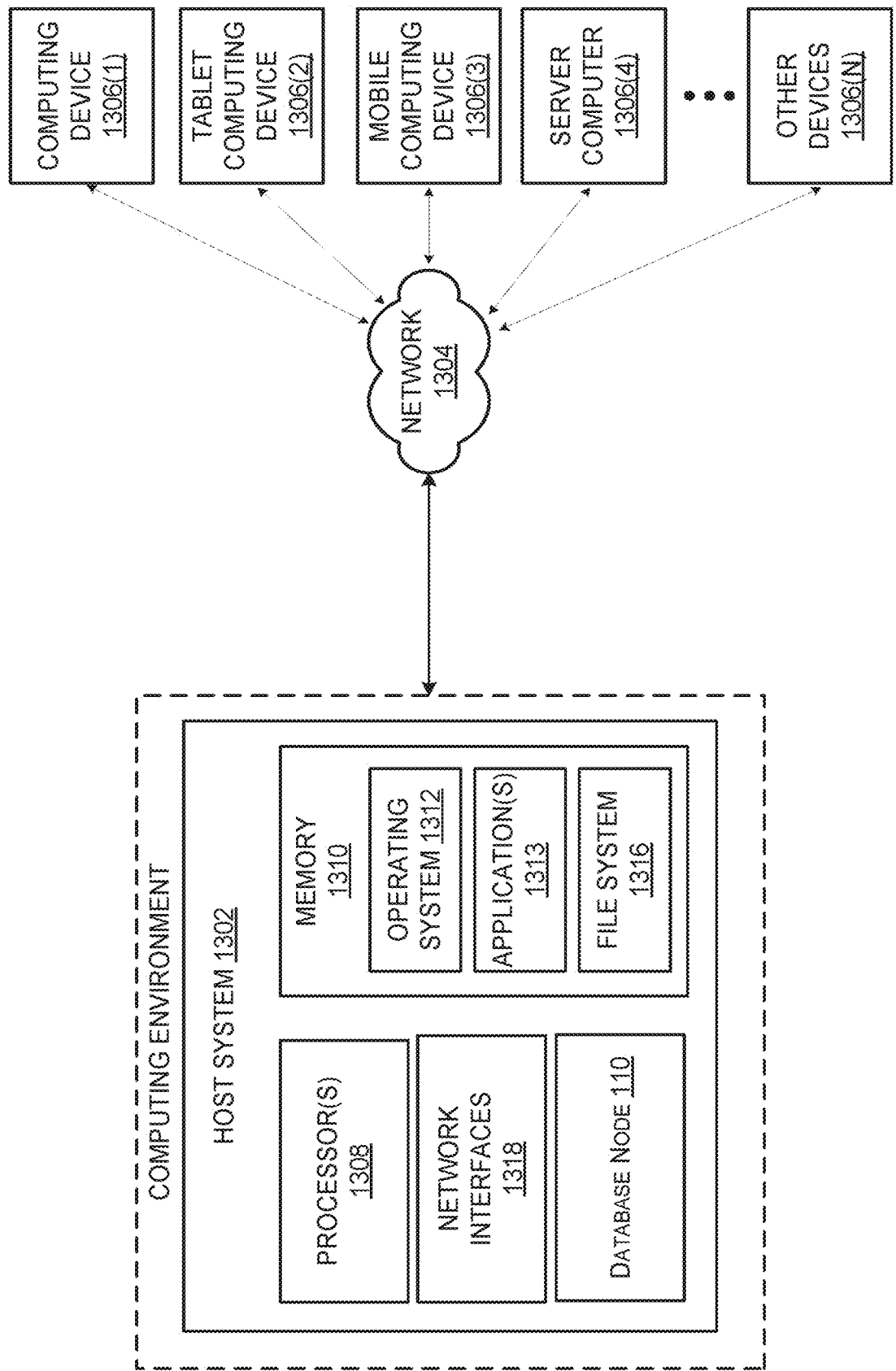
FIG. 13 is a data architecture diagram showing an illustrative example of a computing environment.

FIG. 13 illustrates an example computing environment capable of executing the techniques and processes described above with respect to FIGS. 1-12. In various examples, the computing environment comprises a host system 1302. In various examples, the host system 1302 operates on, in communication with, or as part of a network 1304.

The network 1304 can be or can include various access networks. For example, one or more client devices 1306(1) ... 1306(N) can communicate with the host system 1302 via the network 1304 and/or other connections. The host system 1302 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 1302 can be provided by one or more servers that are executing as part of, or in communication with, the network 1304. A server can host various services, virtual machines, portals, and/or other resources. For example, a can host or provide access to one or more portals, Web sites, and/or other information.

The host system 1302 can include processor(s) 1308 and memory 1310. The memory 1310 can comprise an operating system 1312, application(s) 1314, and/or a file system 1316. Moreover, the memory 1310 can comprise the database node 110 described above with respect to FIGS. 1-12.

The processor(s) 1308 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions.

Among other capabilities, the processor(s) may be configured to fetch and execute computer-readable instructions stored in the memory 1310.

The memory 1310 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 1302 can communicate over the network 1304 via network interfaces 1318. The network interfaces 1318 can include various types of network hardware and software for supporting communications between two or more devices. The host system 1302 may also include rules engine 1319, which may be configured to implement aspects of the functionality disclosed herein.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method, comprising:
periodically retrieving, by a distributed database node, health metrics from mirror hosts, values of the health metrics summarizing database activity on a respective mirror host since previous values of the health metrics were retrieved;
receiving, by the distributed database node, a database query for an entry previously inserted during a specified time period; and
in response to receiving the database query:
generating, at the distributed database node, respective health scores for the mirror hosts based on the health metrics retrieved from respective mirror hosts for the specified time period, the respective health scores for the mirror hosts corresponding to the specified time period during which the entry of the database query was previously inserted;
selecting, by the distributed database node, one of the mirror hosts to perform the database query based on the respective health scores of the mirror hosts relative to a threshold health score; and
forwarding the database query from the distributed database node to the selected one of the mirror hosts.

2. The method of claim 1, wherein the health metrics include at least one of a count of entries added to a mirror host by database insert statements forwarded to the mirror host from the distributed database node, a count of errors caused by the database insert statements, operating system log entries indicating when the mirror host was offline, and resource monitor log entries indicating when one or more hardware components of the mirror host was using all available capacity.

3. The method of claim 1, wherein the generating, at the distributed database node, the respective health scores for the mirror hosts based on the health metrics retrieved from the respective mirror hosts for the specified time period comprises normalizing, weighting, and aggregating the values of the health metrics.

4. The method of claim 1, wherein the selecting, by the distributed database node, the one of the mirror hosts to perform the database query based on the respective health scores of the mirror hosts relative to the threshold health score comprises selecting the one of the mirror hosts having a health score that is greater than the threshold health score and high relative to others of the mirror hosts.

5. The method of claim 4, wherein the one of the mirror hosts to perform the database query is further selected based on respective latencies of processing mirrored database queries during the specified time period responsive to the respective health scores of multiple mirror hosts exceeding the threshold health score.

6. The method of claim 4, wherein the one of the mirror hosts to perform the database query is further selected based on capacity responsive to the respective health scores of multiple mirror hosts exceeding the threshold health score.

7. The method of claim 1, wherein the periodically retrieving, by the distributed database node, the health metrics from the mirror hosts comprises:
submitting a request for the health metrics to the respective mirror host from a health metric aggregator of the distributed database node, the request for the health metrics including at least one of a database request submitted to a mirror database of the respective mirror host and a log request for log information submitted to an operating system running on the respective mirror host; and
receiving, by the health metric aggregator, the health metrics as a health metric query response from the respective mirror host.

8. The method of claim 1, wherein the selecting, by the distributed database node, the one of the mirror hosts to perform the database query based on the respective health scores of the mirror hosts relative to the threshold health score comprises:
in response to none of the respective health scores of the mirror hosts exceeding the threshold health score:
partitioning the database query into at least a first sub-query corresponding to a first portion of the specified time period and a second sub- query corresponding to a second portion of the specified time period;
selecting, by the distributed database node, a first one of the mirror hosts that exceeds the threshold health score during the first portion of the specified time period to perform the first sub-query; and
selecting, by the distributed database node, a second one of the mirror hosts that exceeds the threshold health score during the second portion of the specified time period to perform the second sub-query.

9. The method of claim 8, wherein the forwarding the database query from the distributed database node to the selected one of the mirror hosts comprises:
forwarding the first sub-query to the first one of the mirror hosts; and forwarding the second sub-query to the second one of the mirror hosts.

10. A computing system, comprising:
one or more processors; and
a computer-readable storage medium having computer-executable instructions stored thereupon which, when executed by the one or more processors, cause the one or more processors to:
forward database insert statements received by a distributed database node to a plurality of mirror hosts, wherein each forwarded database insert statement causes one or more database entries to be added to databases on the plurality of mirror hosts;
periodically receive health metrics from the plurality of mirror hosts, values of the health metrics summarizing database activity on respective mirror hosts since previous values of the health metrics were retrieved;
receive a database query from a client computing device for entries previously inserted during a query-specified time period;
generate respective health scores for the plurality of mirror hosts based on the health metrics corresponding to the query-specified time period, the respective health scores for the plurality of mirror hosts corresponding to the query-specified time period during which the entries of the database query were previously inserted;
select a mirror host of the plurality of mirror hosts to receive the database query based on the respective health scores; and
forward the database query to the selected mirror host, causing the selected mirror host to retrieve the entries specified by the database query for delivery to the client computing device.

11. The computing system of claim 10, wherein the health metrics comprise at least one of a count of entries added to a respective mirror host by the forwarded database insert statements during the query-specified time period, a count of errors caused by the forwarded database insert statements during the query-specified time period, a duration the respective mirror host was offline during the query-specified time period, and an overburdened time of a hardware component of the respective mirror host during the query-specified time period.

12. The computing system of claim 10, wherein the computer-executable instructions further cause the one or more processors to:
periodically submit a request for the health metrics to the databases of the plurality of mirror hosts, and wherein the health metrics are received from the plurality of mirror hosts is in response to the request.

13. The computing system of claim 10, wherein the computer-executable instructions further cause the one or more processors to:
periodically submit a request for the health metrics to an operating system running on a respective mirror host, and wherein the health metrics are received from the plurality of mirror hosts is in response to the request.

14. The computing system of claim 10, wherein to select the mirror host of the plurality of mirror hosts to receive the database query based on the respective health scores, the computer-executable instructions further cause the one or more processors to select the mirror host having a high health score relative to others of the plurality of mirror hosts.

15. The computing system of claim 10, wherein to select the mirror host of the plurality of mirror hosts to receive the database query based on the respective health scores, the computer-executable instructions further cause the one or more processors to:

select the mirror host having a health score greater than a threshold health score, and wherein the mirror host to receive the database query is further selected based on an additional metric responsive to determining that the respective health scores of multiple mirror hosts exceed the threshold health score.

16. The computing system of claim 15, wherein the additional metric is a capacity that is based on an average latency of read queries.

17. A computer-readable storage medium having computer-executable instructions stored thereupon which, when executed by a processor of a computing device, cause the computing device to:

forward database insert statements received by a distributed database node to a plurality of mirror hosts, wherein each forwarded database insert statement causes one or more database entries to be added to databases on the plurality of mirror hosts;

periodically receive health metrics from the plurality of mirror hosts, values of the health metrics summarizing database activity on respective mirror hosts since previous values of the health metrics were retrieved;

receive a database query from a client computing device for entries previously inserted during a query-specified time period;

generate respective health scores for the plurality of mirror hosts based on the health metrics corresponding to the query-specified time period, the respective health scores for the plurality of mirror hosts corresponding to the query-specified time period during which the entries of the database query were previously inserted;

select a mirror host of the plurality of mirror hosts to receive the database query based on the respective health scores; and forward the database query to the selected mirror host to cause the selected mirror host to retrieve the entries specified by the database query for delivery to the client computing device.

18. The computer-readable storage medium of claim 17, wherein to generate the respective health scores for the plurality of mirror hosts based on the health metrics corresponding to the query-specified time period, the computer-executable instructions further cause the computing device to:

normalize the health metrics received for the query-specified time period from a respective one of the plurality of mirror hosts;

selectively weight the normalized health metrics; and aggregate the normalized and selectively weighted health metrics to generate a health score of the respective one of the plurality of mirror hosts.

19. The computer-readable storage medium of claim 17, wherein the respective health scores of multiple mirror hosts exceed a quality threshold, and wherein to select the mirror host of the plurality of mirror hosts to receive the database query based on the respective health scores, the computer-executable instructions further cause the computing device to:

select, from the multiple mirror hosts having the respective health scores exceeding the quality threshold, the mirror host to receive the database query based on request query latency information of the multiple mirror hosts.

20. The computer-readable storage medium of claim 17, wherein periodically receiving the health metrics from the plurality of mirror hosts includes one or more of receiving unsolicited health metrics from the plurality of mirror hosts, receiving the health metrics in response to a database request submitted to the databases of respective mirror hosts, and receiving the health metrics in response to a health metric request submitted to an operating system running on the respective mirror hosts.

\* \* \* \* \*